United States Patent
Shinbori et al.

(10) Patent No.: US 8,876,162 B2
(45) Date of Patent: Nov. 4, 2014

(54) VEHICLE

(71) Applicant: Yamaha Hatsudoki Kabushiki Kaisha, Iwata (JP)

(72) Inventors: Masahide Shinbori, Shizuoka (JP); Yasuhiro Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/178,929

(22) Filed: Feb. 12, 2014

(65) Prior Publication Data

US 2014/0225359 A1  Aug. 14, 2014

Related U.S. Application Data

(60) Provisional application No. 61/764,692, filed on Feb. 14, 2013.

(51) Int. Cl.
*B60R 22/00* (2006.01)

(52) U.S. Cl.
USPC .......................................... 280/808; 280/756

(58) Field of Classification Search
USPC ............... 280/756, 801.1, 808; 297/232, 248, 297/249, 257
See application file for complete search history.

(56) References Cited

U.S. PATENT DOCUMENTS

| | | | | |
|---|---|---|---|---|
| 7,677,656 B2 * | 3/2010 | Saberan et al. | ........... | 297/188.04 |
| 7,735,895 B2 * | 6/2010 | Brown et al. | .............. | 296/65.01 |
| 8,353,534 B2 * | 1/2013 | Arnold et al. | .............. | 280/801.1 |
| 2012/0085588 A1 | 4/2012 | Kinsman et al. | | |
| 2012/0217078 A1 * | 8/2012 | Kinsman et al. | .............. | 180/69.4 |

FOREIGN PATENT DOCUMENTS

| | | | |
|---|---|---|---|
| JP | 03-246172 A | 11/1991 | |
| JP | 2000118274 A * | 4/2000 | ............... B60N 2/24 |

* cited by examiner

*Primary Examiner* — Faye M. Fleming
(74) *Attorney, Agent, or Firm* — Keating & Bennett, LLP

(57) ABSTRACT

A vehicle includes a pair of front wheels, a pair of rear wheels, a frame portion, a first seat portion, a second seat portion, a third seat portion, a roll-over protection cage, and a three-point type seat belt unit for the second seat portion. The first seat portion, the second seat portion and the third seat portion are supported by the frame portion and disposed side by side in this order in a width direction of the vehicle. The roll-over protection cage is supported by the frame portion to provide covering above the first seat portion, the second seat portion and the third seat portion.

12 Claims, 26 Drawing Sheets

VEHICLE

BACKGROUND OF THE INVENTION

1. Field of the Invention

The present invention relates to vehicles, and more specifically to a vehicle including a seat belt unit.

2. Description of the Related Art

Conventionally, there is proposed a variety of off-road vehicles (e.g., Recreational Off-Highway Vehicles (ROVs)). For example, US2012/0085588A1 discloses a vehicle which includes a pair of front wheels, a pair of rear wheels, a frame, a roll-over protection cage, and a seat. The frame is supported by the pair of front wheels and the pair of rear wheels. The roll-over protection cage and the seat are supported by the frame. The seat is configured so that the driver and two passengers can sit side by side in a width direction of the vehicle.

However, in such a vehicle as described above, one person of the three, or the person sitting in the middle, tends to make alternate contact with the other two persons sitting on his/her sides when the vehicle undergoes a rolling motion. This can degrade the riding comfort of the person sitting in the middle.

SUMMARY OF THE INVENTION

Therefore, preferred embodiments of the present invention provide a vehicle which includes a first seat portion, a second seat portion and a third seat portion arranged side by side in the width direction, and is capable of reducing or preventing sway of a person sitting in the second seat portion.

According to a preferred embodiment of the present invention, a vehicle includes a pair of front wheels; at least a pair of rear wheels; a frame portion supported by the pair of front wheels and the pair of rear wheels; a first seat portion, a second seat portion and a third seat portion supported by the frame portion and disposed side by side in this order in a width direction of the vehicle; a roll-over protection cage supported by the frame portion to provide covering above the first seat portion, the second seat portion and the third seat portion; and a three-point type seat belt unit for the second seat portion.

In a preferred embodiment of the present invention, it is possible to secure the person sitting in the second seat portion with the seat belt unit. Therefore, even when the vehicle experiences a rolling motion in left and right directions, it is possible to reduce or prevent left and right sways of the person sitting in the second seat portion. This prevents the person sitting in the second seat portion from contacting the persons sitting in the first seat portion and in the third seat portion. As a result, it is possible to reduce or prevent disturbances to the person sitting in the second seat portion.

Preferably, the seat belt unit preferably includes a belt member; a winding device that winds the belt member; a shoulder anchor that slidably supports the belt member which is pulled out of the winding device; and a buckle portion disposed obliquely below the shoulder anchor in a front view to fix the belt member. Further, the roll-over protection cage includes a cross member portion extending in the width direction of the vehicle and including a first end portion and a second end portion; a first connecting portion connected to the frame portion at a lower position than the first end portion and connecting the first end portion and the frame portion to each other; and a second connecting portion connected to the frame portion at a lower position than the second end portion and connecting the second end portion and the frame portion to each other. With the above-described structure, at least a portion of the first connecting portion is located farther outward than the first seat portion in the width direction of the vehicle; at least a portion of the second connecting portion is located farther outward than the third seat portion in the width direction of the vehicle; and the shoulder anchor is supported by the cross member portion. In this case, it is possible to support the shoulder anchor with a constituent portion of the roll-over protection cage, i.e., the cross member portion. In other words, the roll-over protection cage can be used for an additional purpose to support the shoulder anchor. This simplifies the configuration of the vehicle.

Further preferably, the cross member portion is attachable to/detachable from the first connecting portion and the second connecting portion. In this case, the arrangement provides an advantage of detaching the cross member portion when, for example, attaching accessories around the cabin (riding space). This makes it easy to attach accessories to the vehicle.

Further, preferably, the vehicle further includes a steering wheel in front of the first seat portion. With this, the second seat portion includes a seat bottom portion that supports a human body from below; and a back support portion that supports the human body from behind. Further, the roll-over protection cage further includes a third connecting portion extending at a higher position than the cross member portion in the width direction of the vehicle to connect an upper end of the first connecting portion and an upper end of the second connecting portion to each other. With the above-described structure, at least a portion of the third connecting portion is at a higher position than an upper end of the back support portion; at least a portion of the cross member portion is at a higher position than an upper end of the steering wheel; and the shoulder anchor is supported by the cross member portion at a higher position than an upper end of the steering wheel. In this case, since at least a portion of the third connecting portion is at a higher position than the upper end of the back support portion, it is possible to position at least a portion of the third connecting portion at a sufficiently high position. This provides an advantage, for example, that the third connecting portion can be utilized as a roof member. Also, the shoulder anchor is supported by the cross member portion which is disposed at a lower position than the third connecting portion. Further, the shoulder anchor is supported by the cross member portion at a higher position than the upper end of the steering wheel. This arrangement makes it possible to dispose the shoulder anchor at an appropriate position.

Preferably, the second seat portion includes a seat bottom portion that supports a human body from below; and a back support portion that supports the human body from behind. Further, the seat belt unit includes a belt member; a winding device that winds the belt member; a shoulder anchor that slidably supports the belt member pulled out of the winding device; and a buckle portion disposed obliquely below the shoulder anchor in a front view to fix the belt member. With the above structure, at least a portion of the winding device is at a more rearward position than a forward end and at a more forward position than a rearward end of the back support portion in a side view. In this case, since at least a portion of the winding device is at a more rearward position than a forward end of the back support portion, it is possible to prevent cases where the winding device is disposed at an unduly forward position. Thus, it is possible that the belt member is smoothly pulled out of the winding device. Also, since at least a portion of the winding device is at a more forward position than the rearward end of the back support portion, it is possible to provide the winding device without a large rearward distance from the back support portion in a fore-aft direction. Thus, it is possible to effectively utilize space behind the back support portion.

Further preferably, the vehicle further includes a steering wheel in front of the first seat portion. With this structure, the shoulder anchor is on the first seat portion side when viewed from the second seat portion in a width direction of the vehicle. In this case, it is possible to sufficiently reduce or prevent swaying of the passenger sitting in the second seat portion toward the first seat portion. Thus, the driver can drive the vehicle more comfortably.

Further, preferably, at least one of the first seat portion, the second seat portion and the third seat portion includes a headrest portion. With this, the roll-over protection cage includes a support portion supporting the headrest portion, and the shoulder anchor is supported by the support portion. In this case, it is possible to support the shoulder anchor with the support portion which is the portion for supporting the headrest portion. In other words, the support portion can be used for two purposes, i.e., to support the headrest portion and to support the shoulder anchor. This simplifies the configuration of the vehicle.

Preferably, the first seat portion includes a first headrest portion; the second seat portion further includes a second headrest portion; and the third seat portion includes a third headrest portion. Further, the roll-over protection cage includes a first support portion supporting the first headrest portion; a second support portion supporting the second headrest portion; and a third support portion supporting the third headrest portion. With this structure, the shoulder anchor is supported by the second support portion. In this case, since the shoulder anchor is supported by the second support portion which supports the second headrest portion, it becomes possible to dispose the shoulder anchor near the second seat portion. Thus, it becomes possible to support the belt member at a more appropriate position via the shoulder anchor.

Further preferably, the vehicle further includes a cargo bed provided behind the roll-over protection cage and supported by the frame portion. Further, the second seat portion includes a seat bottom portion and a seat back portion; the seat belt unit includes a belt member, a winding device that winds the belt member, a shoulder anchor that slidably supports the belt member pulled out of the winding device, and a buckle portion disposed obliquely below the shoulder anchor in a front view to fix the belt member. With the above, at least a portion of the winding device is at a more rearward position than a forward end of the seat back portion, and at a more forward position than a rearward end of the roll-over protection cage in a side view. In this case, since at least a portion of the winding device is at a more rearward position than the forward end of the seat back portion, it is possible to prevent cases where the winding device is disposed at an unduly forward position. Thus, it is possible that the belt member is smoothly pulled out of the winding device. Also, at least a portion of the winding device is at a more forward position than the rear end of the roll-over protection cage. In this case, it is possible to dispose the winding device ahead of the cargo bed without a large distance between the roll-over protection cage and the cargo bed in a fore-aft direction. This makes it possible to make the vehicle compact.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
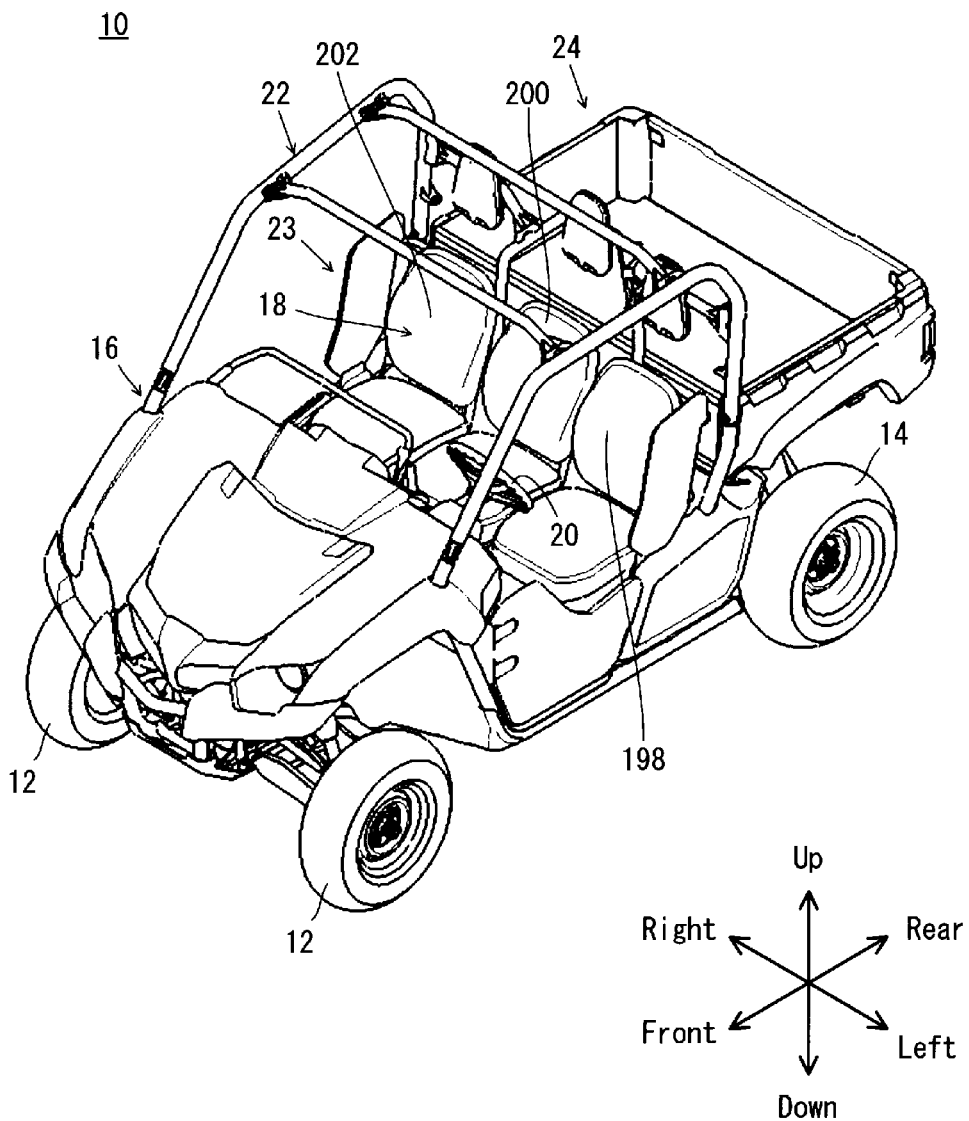
FIG. 1 is a perspective view of a vehicle according to a preferred embodiment of the present invention.
Figure 2:
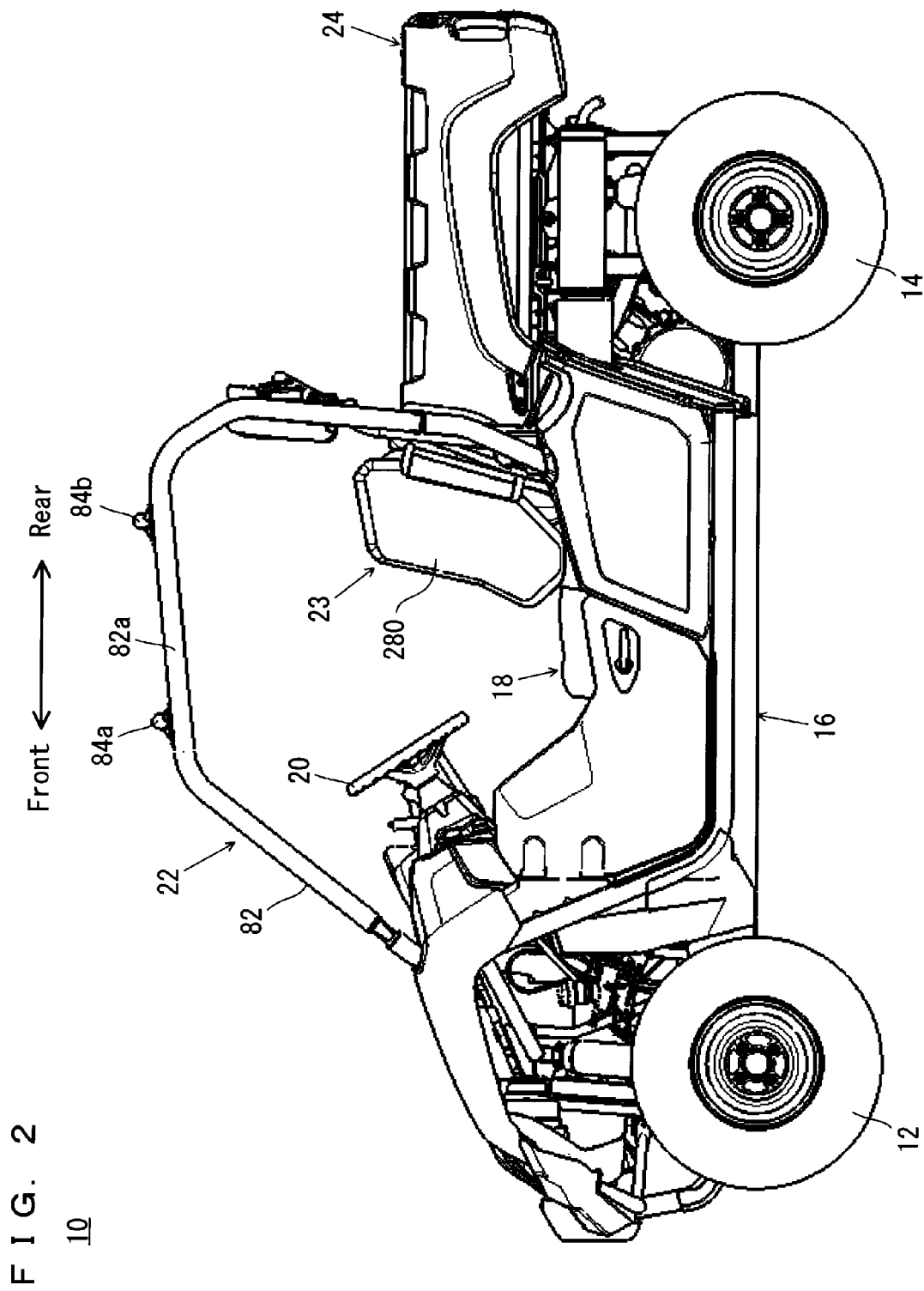
FIG. 2 is a side view of the vehicle.

Hereinafter, preferred embodiments of the present invention will be described with reference to the drawings. It is noted that the terms front and rear, right and left, up and down as used below in the description of the preferred embodiments of the present invention are determined from the driver's position on a seat portion 198 of a vehicle 10, with the driver facing toward a steering wheel 20.

Referring to FIG. 1 through FIG. 5, the vehicle 10 according to a preferred embodiment of the present invention preferably is a four-wheel-drive recreational off-highway vehicle (ROV), and includes a pair of front wheels 12, a pair of rear wheels 14, a frame portion 16, a seat unit 18, a steering wheel 20, a roll-over protection cage 22, a shoulder bolster portion 23 and a cargo bed 24. The frame portion 16 is supported by the pair of front wheels 12 and the pair of rear wheels 14. Referring to FIG. 6, the frame portion 16 includes a main frame portion 16a supported by the pair of front wheels 12 (see FIG. 1) and the pair of rear wheels 14 (see FIG. 1); and a seat frame portion 16b supported by the main frame portion 16a. The seat unit 18 is supported by the seat frame portion 16b. The cargo bed 24 is behind the roll-over protection cage 22 and is supported by the frame portion 16.

Figure 7:
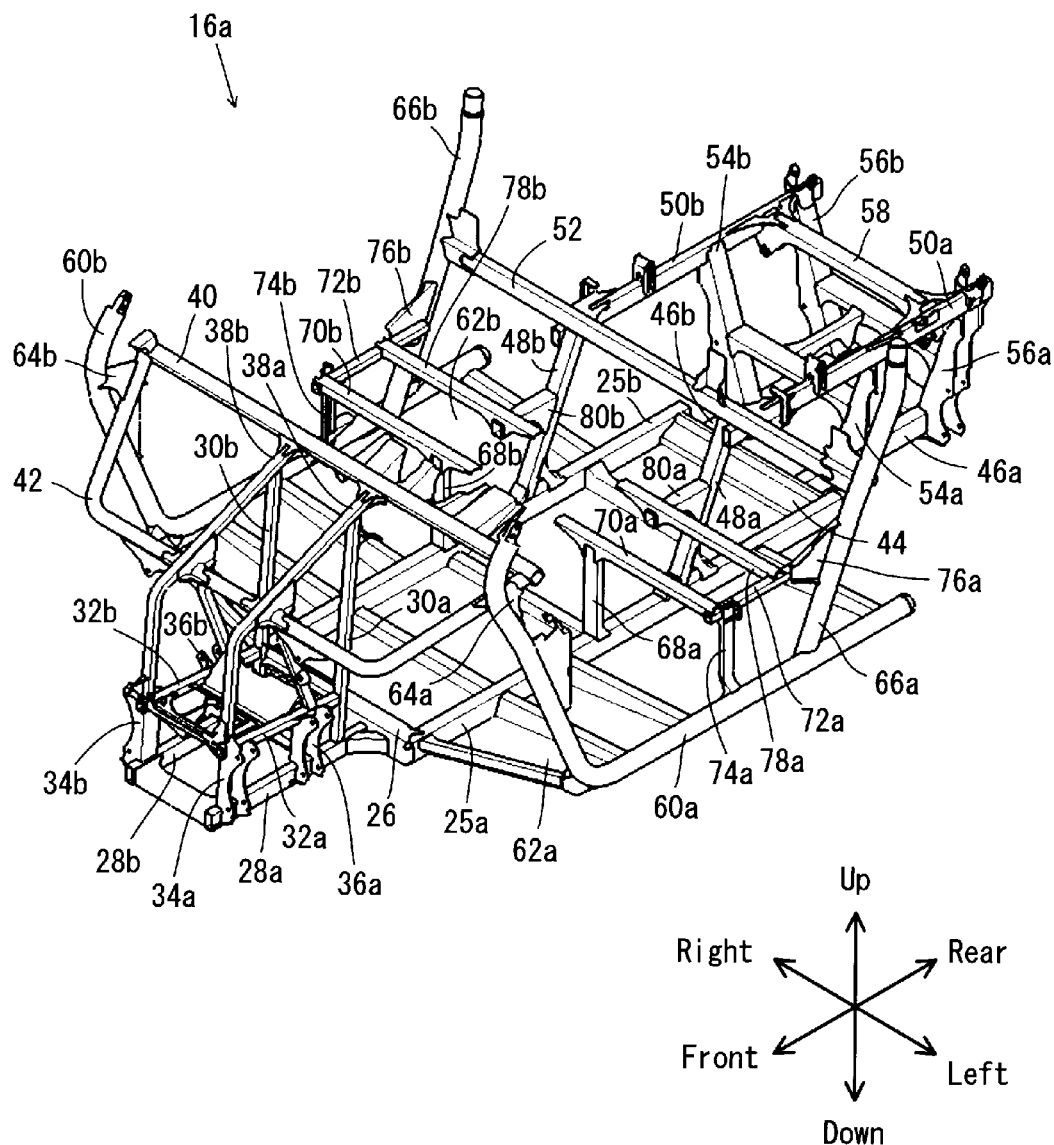
FIG. 7 is a perspective view of a main frame portion.

Referring to FIG. 7, the main frame portion 16a includes a pair of side frame portions 25a, 25b extending in a fore-aft direction. The side frame portion 25a and the side frame portion 25b are parallel or substantially parallel to each other. The side frame portion 25a and the side frame portion 25b have their respective forward ends connected to each other by a cross member 26 extending in a left-right direction (a width direction of the vehicle 10).

From the cross member 26, a pair of side frame portions 28a, 28b extend forward. In the width direction of the vehicle 10, the side frame portions 28a, 28b are on an inner side than the side frame portions 25a, 25b. The side frame portion 28a and the side frame portion 28b are parallel or substantially parallel to each other. A pair of support frame portions 30a, 30b extend upward from respective rearward regions of the side frame portions 28a, 28b.

Above the side frame portions 28a, 28b, a pair of side frame portions 32a, 32b extend forward from the support frame portions 30a, 30b. The side frame portion 32a and the side frame portion 32b are parallel or substantially parallel to each other.

The side frame portions 28a, 28b have their forward end regions connected to respective forward end regions of the side frame portions 32a, 32b by a pair of support frame portions 34a, 34b extending in an up-down direction. The side frame portions 28a, 28b have their rearward regions connected to respective rearward regions of the side frame portions 32a, 32b by a pair of support frame portions 36a, 36b extending in an up-down direction. The support frame portions 36a, 36b are at a more rearward position than the support frame portions 34a, 34b.

The side frame portions 32a, 32b have their forward end regions connected to a pair of support frame portions 38a, 38b. The support frame portions 38a, 38b extend upward from the side frame portions 32a, 32b, and then obliquely in a rearward and upward direction. The support frame portions 30a, 30b have their upper ends connected to respective rearward end regions of the support frame portions 38a, 38b. The support frame portions 38a, 38b have their rear ends connected to a cross member 40 extending in a left-right direction.

From the cross member 40, a U-shaped or substantially U-shaped frame portion 42 extends forward, below the support frame portions 38a, 38b. The U-shaped or substantially U-shaped frame portion 42 includes two end regions connected to respective end regions of the cross member 40. The U-shaped or substantially U-shaped frame portion 42 has an intermediate portion connected to the support frame portions 38a, 38b.

The side frame portion 25a and the side frame portion 25b have their respective rearward end regions connected to each other by a cross member 44 extending in a left-right direction.

From the cross member 44, a pair of side frame portions 46a, 46b extend rearward. In the width direction of the vehicle 10, the side frame portions 46a, 46b are on an inner side than the side frame portions 25a, 25b. The side frame portion 46a and the side frame portion 46b are parallel or substantially parallel to each other.

At a more forward position than the cross member 44, a pair of support frame portions 48a, 48b extend obliquely in an upward and rearward direction from the pair of side frame portions 25a, 25b. At a higher position than the side frame portions 46a, 46b, a pair of side frame portions 50a, 50b extend in a fore-aft direction. The side frame portion 50a and the side frame portion 50b are parallel or substantially parallel to each other. In the width direction of the vehicle 10, the side frame portions 50a, 50b are on an outer side than the side frame portions 46a, 46b. The cargo bed 24 (see FIG. 1) is supported by the side frame portions 50a, 50b. The side frame portions 50a, 50b have their forward end regions connected to respective upper end regions of the support frame portions 48a, 48b. The support frame portions 48a, 48b have their upper ends connected to a cross member 52 extending in a left-right direction.

Referring to FIG. 6 and FIG. 7, the side frame portions 46a, 46b and the side frame portions 50a, 50b are connected to each other by a pair of support frame portions 54a, 54b which extend in an up-down direction and a pair of support frame portions 56a, 56b which extend in an up-down direction. The support frame portions 54a, 54b are at a more forward position than the support frame portions 56a, 56b. The side frame portion 50a and the side frame portion 50b are connected to each other by a cross member 58 extending in a left-right direction. The cross member 58 is at a position which is more rearward than the support frame portions 54a, 54b and more forward than the support frame portions 56a, 56b.

In the width direction of the vehicle 10, there is provided a pair of L-shaped or substantially L-shaped support frame portions 60a, 60b on respective outer sides of the side frame portions 25a, 25b. The support frame portion 60a is connected to the side frame portion 25a via a plate frame portion 62a, whereas the support frame portion 60b is connected to the side frame portion 25b via a plate frame portion 62b.

Referring to FIG. 7, the support frame portions 60a, 60b have their upper regions connected to two end regions of the U-shaped or substantially U-shaped frame portion 42 via connecting members 64a, 64b. A pair of support frame portions 66a, 66b extend obliquely in an upward and rearward direction from rearward regions of the support frame portions 60a, 60b. The support frame portions 66a, 66b have their substantially intermediate regions connected to two end regions of the cross member 52.

A pair of support frame portions 68a, 68b extend upward from substantially intermediate regions of the side frame portions 25a, 25b. A pair of support frame portions 70a, 70b extend in a left-right direction, being supported by upper ends of the support frame portions 68a, 68b. The support frame portion 70a has an end region (left end region in the present preferred embodiment) connected to a forward end region of a support frame portion 72a which extends in a fore-aft direction, whereas the support frame portion 70b has an end region (right end region in the present preferred embodiment) connected to a forward end region of a support frame portion 72b which extends in a fore-aft direction.

The support frame portion 72a has a forward region connected to the support frame portion 60a by a support frame portion 74a which extends in an up-down direction, whereas the support frame portion 72b has a forward region connected to the support frame portion 60b by a support frame portion 74*b* which extends in an up-down direction. The support frame portion 72*a* has a rearward region connected to the support frame portion 66*a* via a connecting member 76*a*, whereas the support frame portion 72*b* has a rearward region connected to the support frame portion 66*b* via a connecting member 76*b*.

Behind the support frame portion 70*a*, a support frame portion 78*a* is parallel or substantially parallel to the support frame portion 70*a*, whereas behind the support frame portion 70*b*, a support frame portion 78*b* is parallel or substantially parallel to the support frame portion 70*b*. The support frame portion 78*a* has an end region (left end region in the present preferred embodiment) connected to the support frame portion 72*a*, whereas the support frame portion 78*b* has an end region (right end region in the present preferred embodiment) connected to the support frame portion 72*b*.

A pair of support frame portions 80*a*, 80*b* extend forward from substantially intermediate regions of the support frame portions 48*a*, 48*b*. The support frame portions 80*a*, 80*b* have their forward end regions connected to the support frame portions 78*a*, 78*b*.

Referring to FIG. 6 and FIG. 7, the seat unit 18 is supported by the support frame portions 70*a*, 70*b*, 78*a*, 78*b* of the main frame portion 16*a* via the seat frame portion 16*b*. Referring to FIG. 1, the steering wheel 20 is in front of the seat portion 198, which will be described later, of the seat unit 18. The roll-over protection cage 22 covers above the seat unit 18 and the steering wheel 20. The roll-over protection cage 22 is supported by the frame portion 16.

Figure 8:
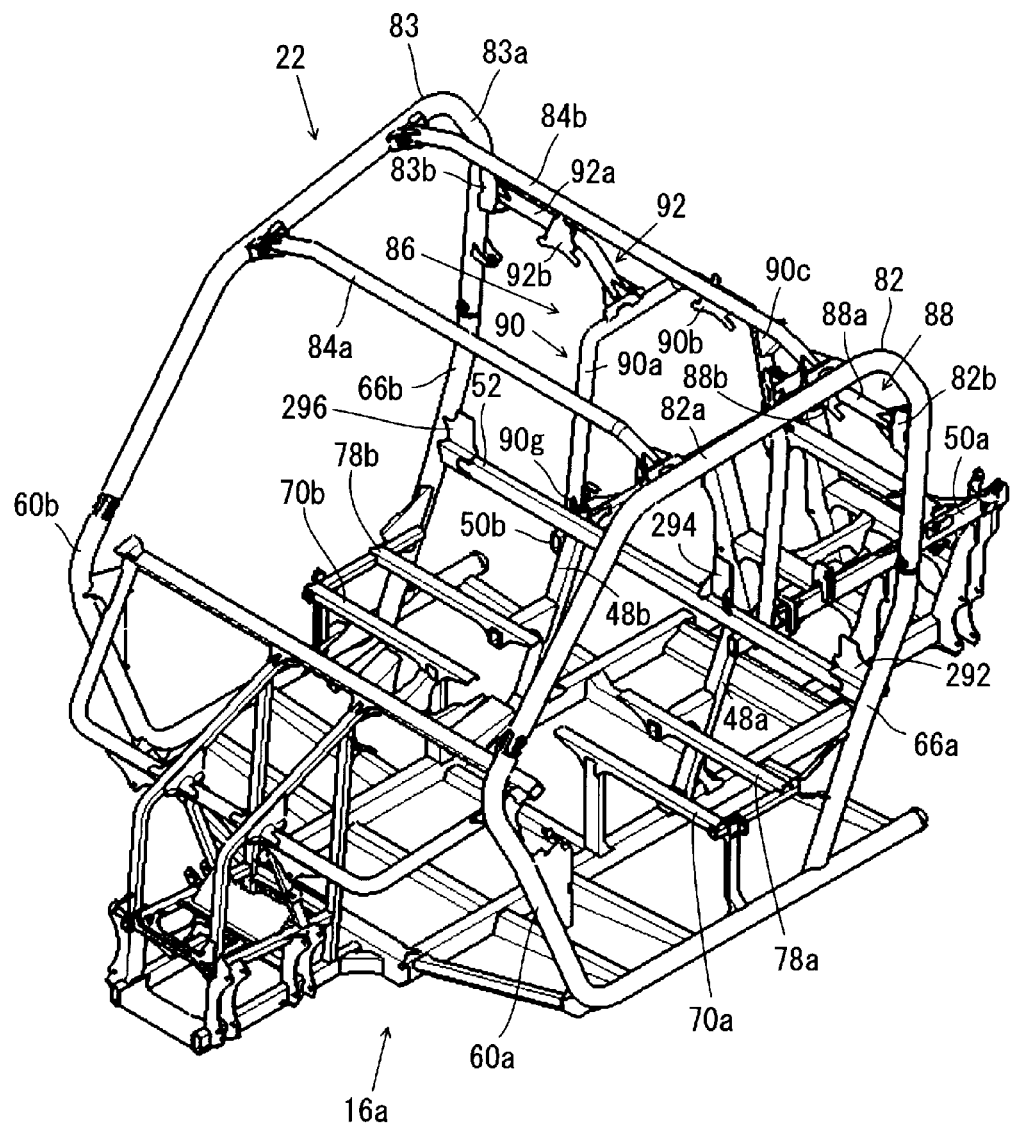
FIG. 8 is a perspective view of the main frame portion and the roll-over protection cage.

Referring to FIG. 8, the roll-over protection cage 22 includes a pair of side cage members 82, 83 extending in a fore-aft direction; a pair of roof members 84*a*, 84*b* extending in a left-right direction; and a cross member portion 86 extending in a left-right direction.

The side cage member 82 includes a main body portion 82*a* which has a shape of an inverted letter of U or a shape substantially of an inverted letter of U, in a side view; and a connecting portion 82*b* at a rearward region of the main body portion 82*a*. The connecting portion 82*b* protrudes inward (rightward in the present preferred embodiment) from the main body portion 82*a* in the width direction of the vehicle 10. The side cage member 83 includes a main body portion 83*a* which has a shape of an inverted letter of U or a shape substantially of an inverted letter of U, in a side view; and a connecting portion 83*b* at a rearward region of the main body portion 83*a*. The connecting portion 83*b* protrudes inward (leftward in the present preferred embodiment) from the main body portion 83*a* in the width direction of the vehicle 10.

The main body portions 82*a*, 83*a* are supported by the frame portion 16. More specifically, the main body portion 82*a* has an end region (forward end region in the present preferred embodiment), which is connected to an upper end region of the support frame portion 60*a*; and the main body portion 82*a* has another end region (rearward end region in the present preferred embodiment), which is connected to an upper end region of the support frame portion 66*a*. The main body portion 82*a* is fixed to the support frame portions 60*a*, 66*a* with, e.g., fasteners (such as bolts and nuts), for example. Likewise, the main body portion 83*a* has an end region (forward end region in the present preferred embodiment), which is connected to an upper end region of the support frame portion 60*b*; and the main body portion 83*a* has another end region (rearward end region in the present preferred embodiment), which is connected to an upper end region of the support frame portion 66*b*. The main body portion 83*a* is fixed to the support frame portions 60*b*, 66*b* with, e.g., fasteners (such as bolts and nuts), for example.

The roof members 84*a*, 84*b* connect an upper region of the side cage member 82 to an upper region of the side cage member 83. The roof member 84*b* is at a more rearward position than the roof member 84*a*. The roof member 84*b* is at a higher position than a back support portion 210 to be described later (see FIG. 18) of the seat unit 18.

Figure 3:
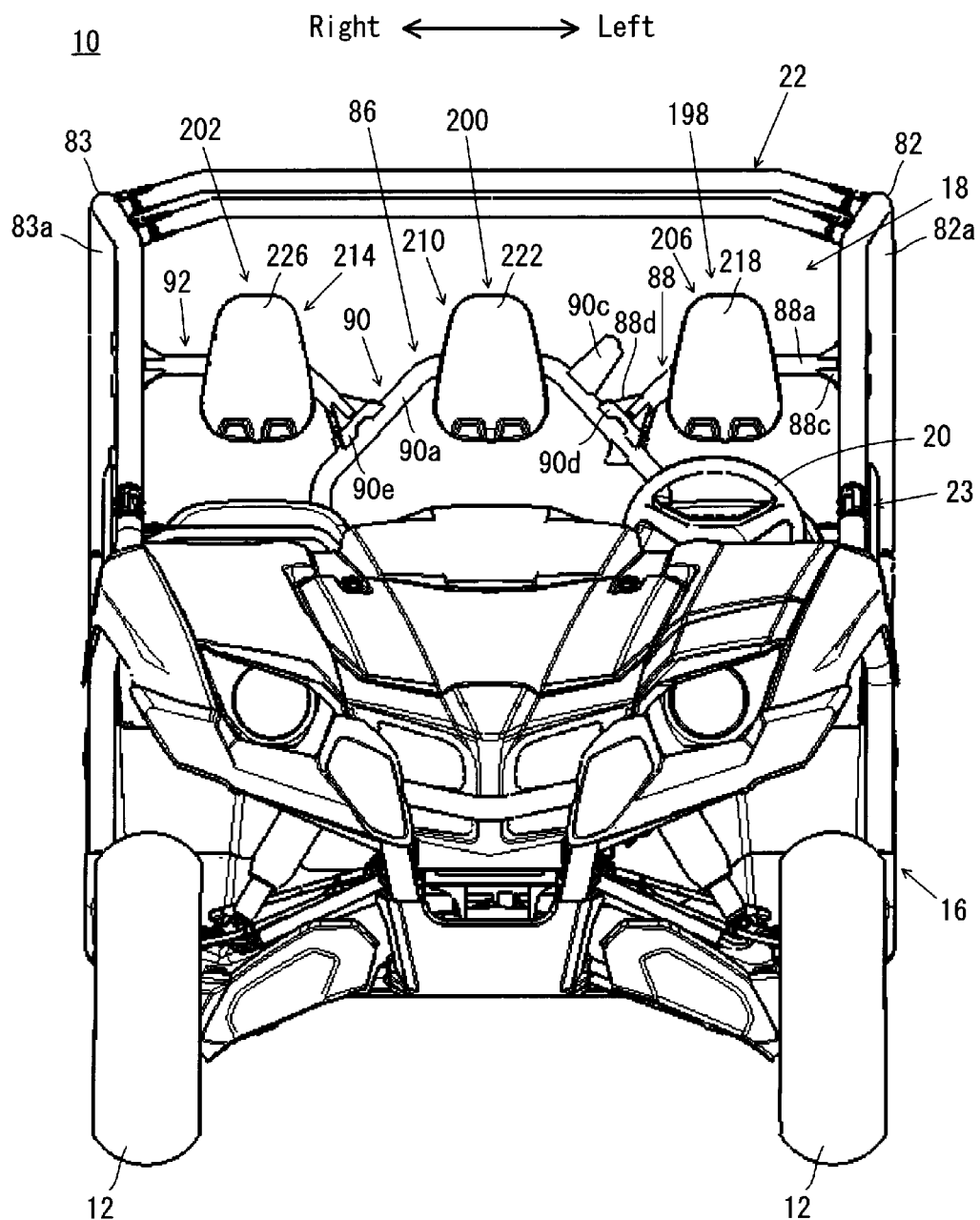
FIG. 3 is a front view of the vehicle.
Figure 5:
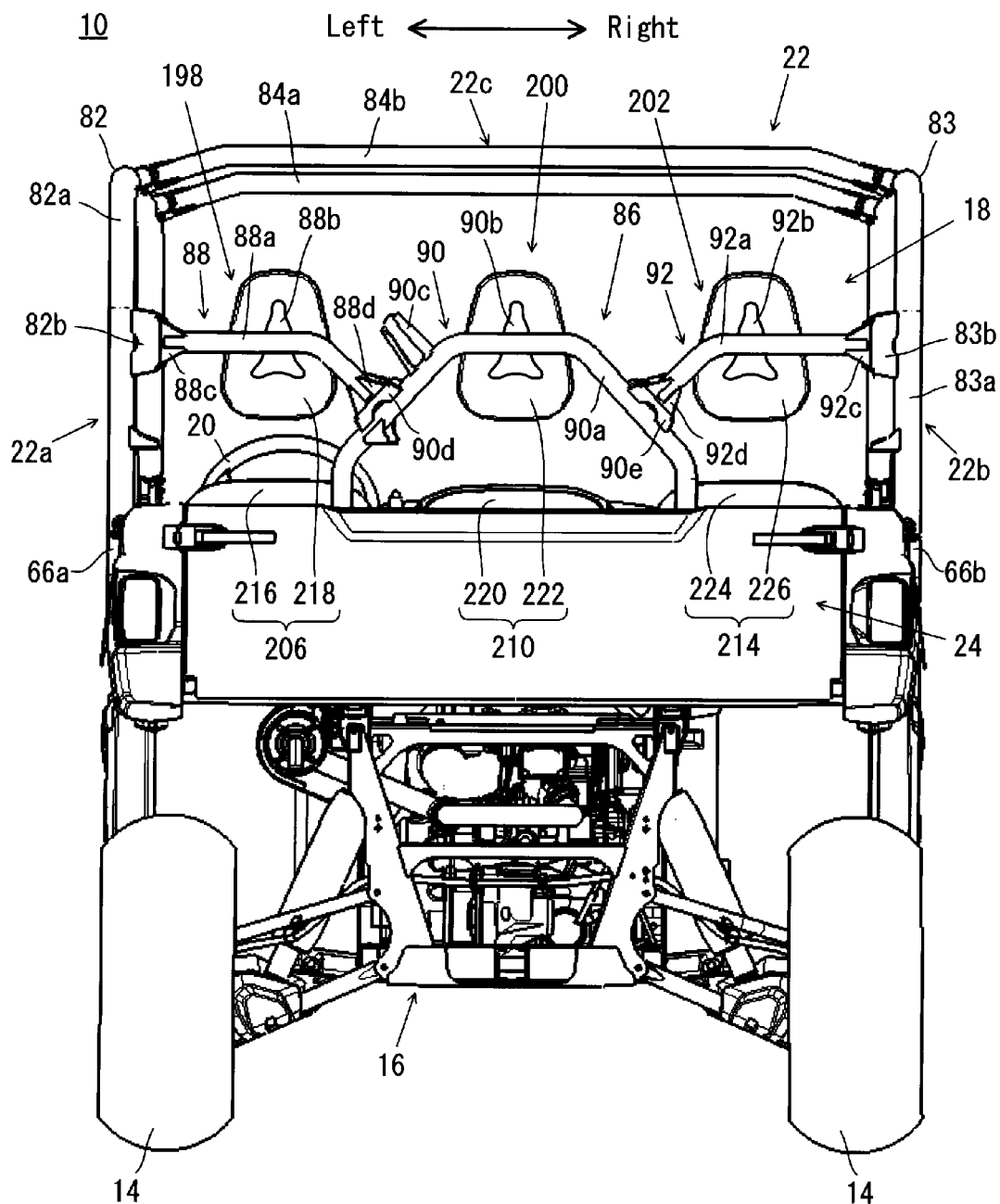
FIG. 5 is a rear view of the vehicle.
Figure 6:
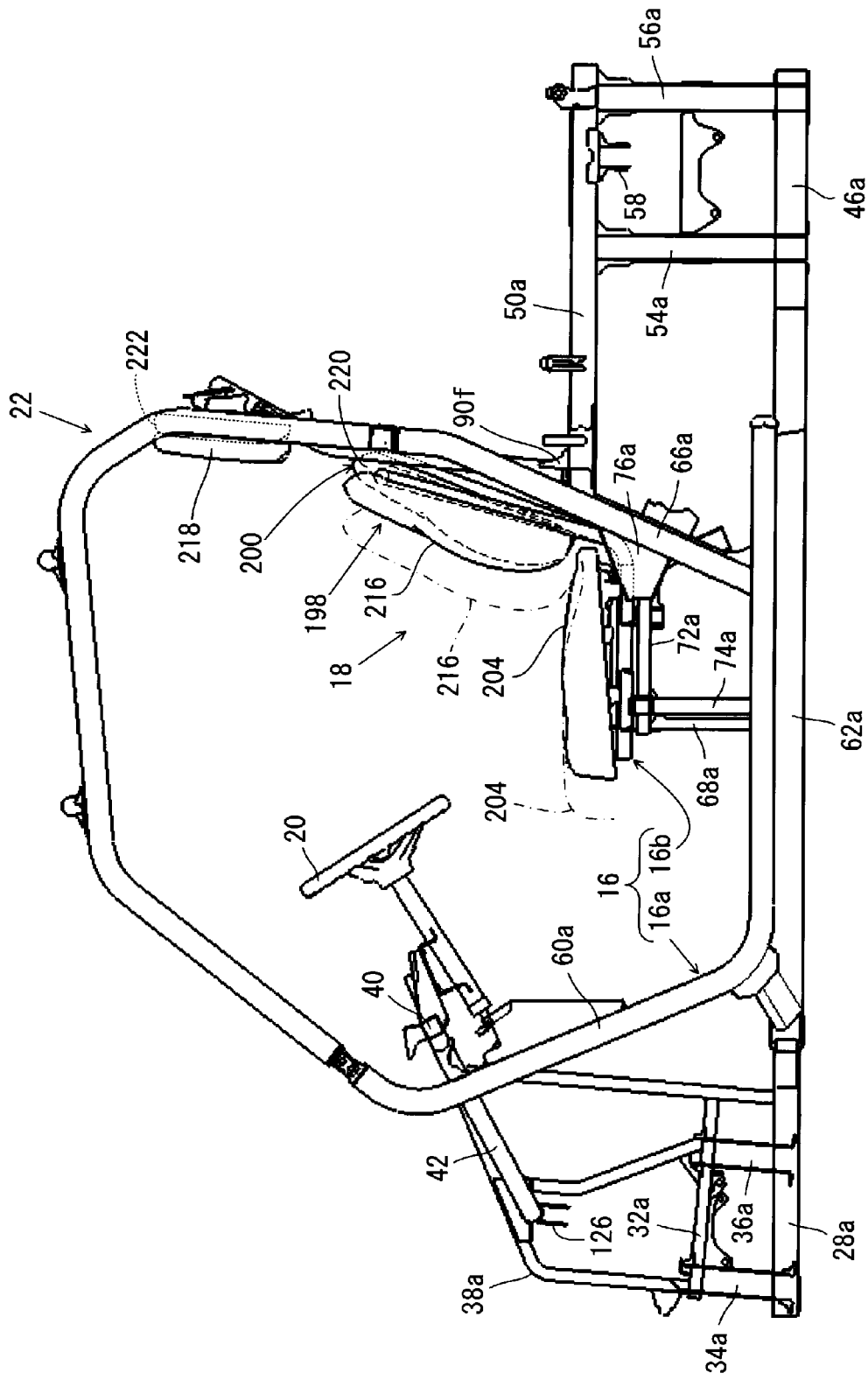
FIG. 6 is a side view showing a frame portion, a seat unit, a steering wheel and a roll-over protection cage.

Referring to FIG. 3, FIG. 5 and FIG. 8, the cross member portion 86 includes a support member 88, a support member 90 and a support member 92. The support member 90 is at an intermediate portion in the width direction of the vehicle 10, the support member 88 connects the support member 90 and the side cage member 82 to each other, and the support member 92 connects the support member 90 and the side cage member 83 to each other.

In the present preferred embodiment, the support member 88 represents the first support portion, the support member 90 represents the second support portion and the support member 92 represents the third support portion.

Referring to FIG. 5, the support member 88 includes a main body portion 88*a* extending in a left-right direction; a mounting portion 88*b* fixed to an intermediate region of the main body portion 88*a*; a connecting portion 88*c* fixed to an end region (left end region in the present preferred embodiment) of the main body portion 88*a*; and a connecting portion 88*d* fixed to another end region (right end region in the present preferred embodiment) of the main body portion 88*a*. To the mounting portion 88*b*, a headrest portion 218, which will be described later, of the seat unit 18 is attached. The connecting portion 88*c* is connected detachably from/attachably to the connecting portion 82*b* of the side cage member 82. Specifically, the connecting portion 88*c* is connected to the connecting portion 82*b* of the side cage member 82 with unillustrated fasteners (such as bolts and nuts), for example. The connecting portion 88*d* is connected to a connecting portion 90*d*, which will be described later, of the support member 90 with unillustrated fasteners (such as bolts and nuts), for example.

Figure 4:
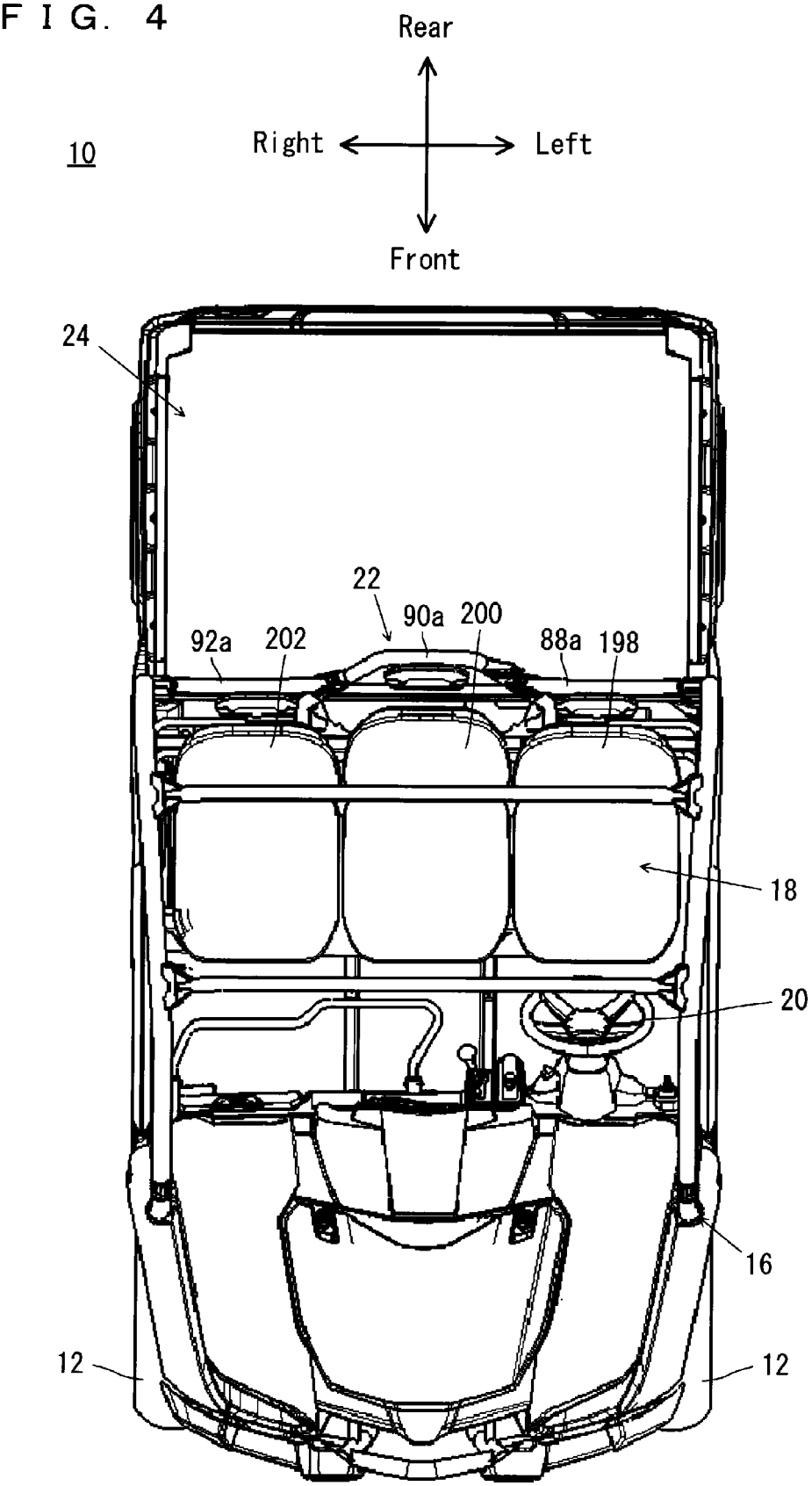
FIG. 4 is a plan view of the vehicle.

Referring to FIG. 5 and FIG. 8, the support member 90 includes a main body portion 90*a* which has a shape of an inverted letter of U or a shape substantially of an inverted letter of U, in a front view; a mounting portion 90*b* located at an upper end region, i.e., an intermediate region, of the main body portion 90*a*; and a mounting portion 90*c* which extends obliquely upward from the main body portion 90*a* on a side closer to the support member 88 when viewed from the mounting portion 90*b*. Referring to FIG. 4, the upper end region of the main body portion 90*a* is at a more rearward position than the main body portion 88*a* and a main body portion 92*a* to be described later. Therefore, referring to FIG. 5 and FIG. 8, the mounting portion 90*b* is at a more rearward position than the mounting portion 88*b* and a mounting portion 92*b* to be described later.

Referring to FIG. 5, a headrest portion 222, which will be described later, of the seat unit 18 is attached to the mounting portion 90*b*. To the mounting portion 90*c*, a shoulder anchor 288*c* which will be described later (see FIG. 25) is attached.

The support member 90 further includes a pair of connecting portions 90*d*, 90*e* fixed to the main body portion 90*a*. The connecting portion 90*d* is on a side closer to the support member 88 than the mounting portion 90*c* when viewed from the mounting portion 90*b*, whereas the connecting portion 90*e* is on a side closer to the support member 92 when viewed from the mounting portion 90*b*. As has been described earlier, the connecting portion 90*d* is connected to the connecting portion 88*d* of the support member 88. The connecting portion 90*e* is connected to a connecting portion 92*d*, which will be described later, of the support member 92 with unillustrated fasteners (such as bolts and nuts), for example.

Referring to FIG. 6 and FIG. 8, the support member 90 further includes a pair of connecting portions 90f, 90g fixed to two end regions of the main body portion 90a. The main body portion 90a has two end regions connected detachably from/attachably to the side frame portions 50a, 50b via the connecting portions 90f, 90g. Specifically, the connecting portions 90f, 90g of the support member 90 are connected to the side frame portions 50a, 50b with unillustrated fasteners (such as bolts and nuts), for example.

Referring to FIG. 5, the support member 92 includes a main body portion 92a extending in a left-right direction; a mounting portion 92b fixed to an intermediate region of the main body portion 92a; a connecting portion 92c fixed to an end region (right end region in the present preferred embodiment) of the main body portion 92a; and a connecting portion 92d fixed to another end region (left end region in the present preferred embodiment) of the main body portion 92a. To the mounting portion 92b, a headrest portion 226, which will be described later, of the seat unit 18 is attached. The connecting portion 92c is connected detachably from/attachably to the connecting portion 83b of the side cage member 83. Specifically, the connecting portion 92c is connected to the connecting portion 83b of the side cage member 83 with unillustrated fasteners (such as bolts and nuts), for example. As has been described earlier, the connecting portion 92d is connected to the connecting portion 90e of the support member 90.

Due to the arrangement described above, the cross member portion 86 is attached detachably from/attachably to the side frame portions 50a, 50b of the frame portion 16 and the side cage members 82, 83 of the roll-over protection cage 22. At least a portion of the cross member portion 86 is at a higher position than an upper end of the steering wheel 20.

In the present preferred embodiment, the connecting portion 88c represents the first end portion, whereas the connecting portion 92c represents the second end portion. Also, in the present preferred embodiment, a portion of the main body portion 82a which is lower than an upper end of the connecting portion 82b, and the connecting portion 82b constitute the first connecting portion 22a, whereas a portion of the main body portion 83a which is lower than an upper end of the connecting portion 83b, and the connecting portion 83b constitute the second connecting portion 22b. In the present preferred embodiment, the cross member portion 86 is connected to the first connecting portion 22a and the second connecting portion 22b detachably therefrom/attachably thereto. Further, in the present preferred embodiment, a portion of the main body portion 82a which connects an upper end of the first connecting portion 22a to a left end region of the roof member 84b; a portion of the main body portion 83a which connects an upper end of the second connecting portion 22b to a right end region of the roof member 84b; and the roof member 84b constitute the third connecting portion 22c. The third connecting portion 22c has a shape of an inverted letter of U or substantially a shape of an inverted letter of U in a rear view.

The first connecting portion 22a is connected to the frame portion 16 (more specifically, the support frame portion 66a) at a lower position than the connecting portion 88c, and connects the connecting portion 88c and the frame portion 16 to each other. In the width direction of the vehicle 10, at least a portion of the first connecting portion 22a is located farther outward than a seat portion 198 which will be described later.

The second connecting portion 22b is connected to the frame portion 16 (more specifically, the support frame portion 66b) at a lower position than the connecting portion 92c, and connects the connecting portion 92c and the frame portion 16 to each other. In the width direction of the vehicle 10, at least a portion of the second connecting portion 22b is located farther outward than a seat portion 202 which will be described later.

The third connecting portion 22c extends in the width direction of the vehicle 10 above the cross member portion 86, and connects an upper end of the first connecting portion 22a and an upper end of the second connecting portion 22b to each other. At least a portion of the third connecting portion 22c is at a higher position than an upper end of a back support portion 210 (in the present preferred embodiment, an upper end of a headrest portion 222 to be described later) which will be described later.

Referring to FIG. 9 through FIG. 12, the vehicle 10 further includes a pair of suspension assemblies 94a, 94b which suspend the pair of front wheels 12 (see FIG. 1); a rotation transmission portion 96 which transmits rotation from an engine 178 (see FIG. 13), which will be described later, to the pair of front wheels 12; a pair of suspension assemblies 98a, 98b which suspend the pair of rear wheels 14 (see FIG. 1); a rotation transmission portion 100 which transmits rotation from the engine 178 to the pair of rear wheels 14; and a rear stabilizer 102 which connects the suspension assemblies 98a, 98b to each other. The frame portion 16 (see FIG. 1) is supported by the pair of front wheels 12 and the pair of rear wheels 14 via the suspension assemblies 94a, 94b, 98a, 98b. In the present preferred embodiment, the suspension assemblies 94a, 94b, 98a, 98b are double wishbone type suspension assemblies, for example.

Figure 10:
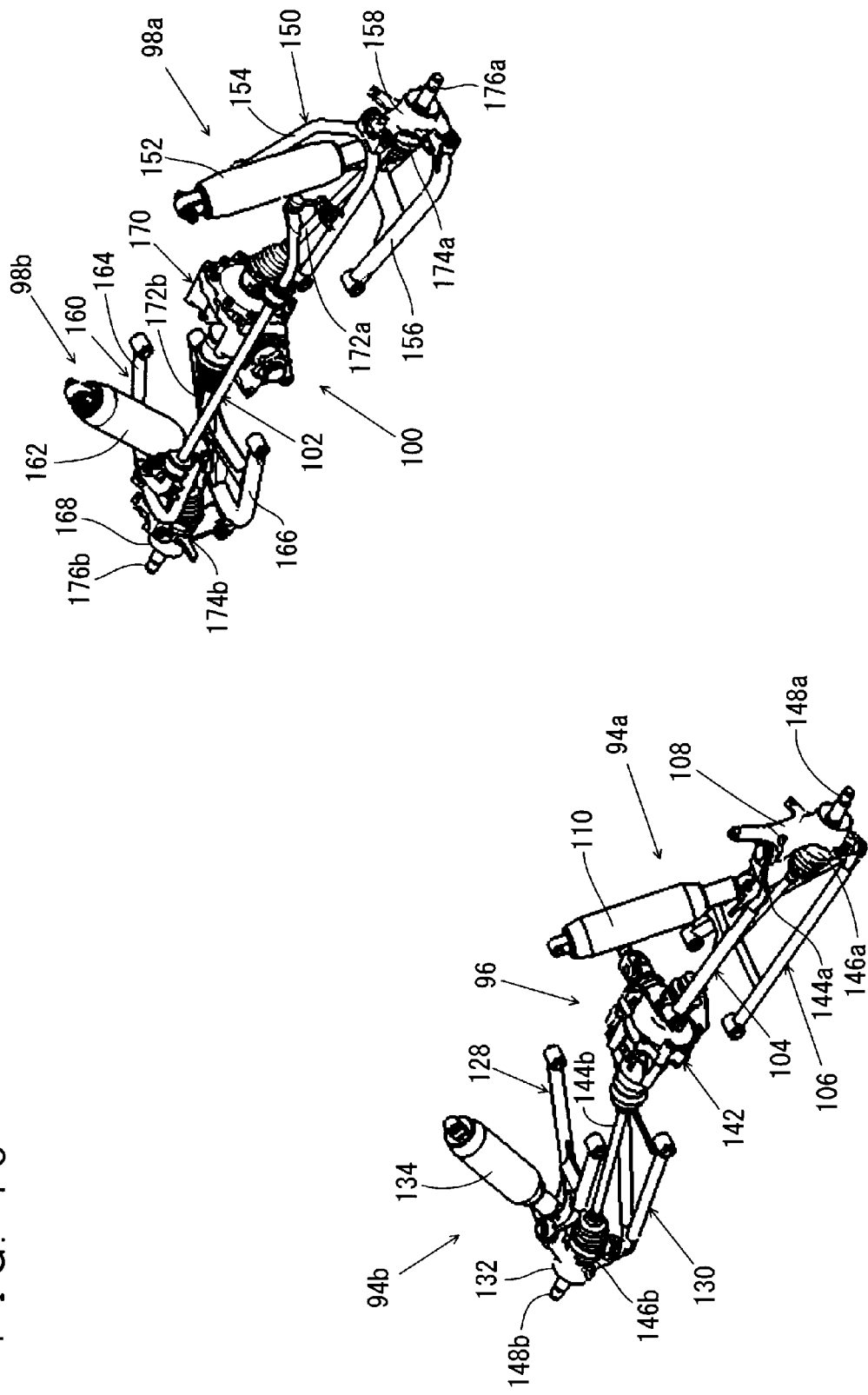
FIG. 10 is a perspective view showing the pair of suspension assemblies for front wheels and the pair of suspension assemblies for rear wheels.
Figure 11:
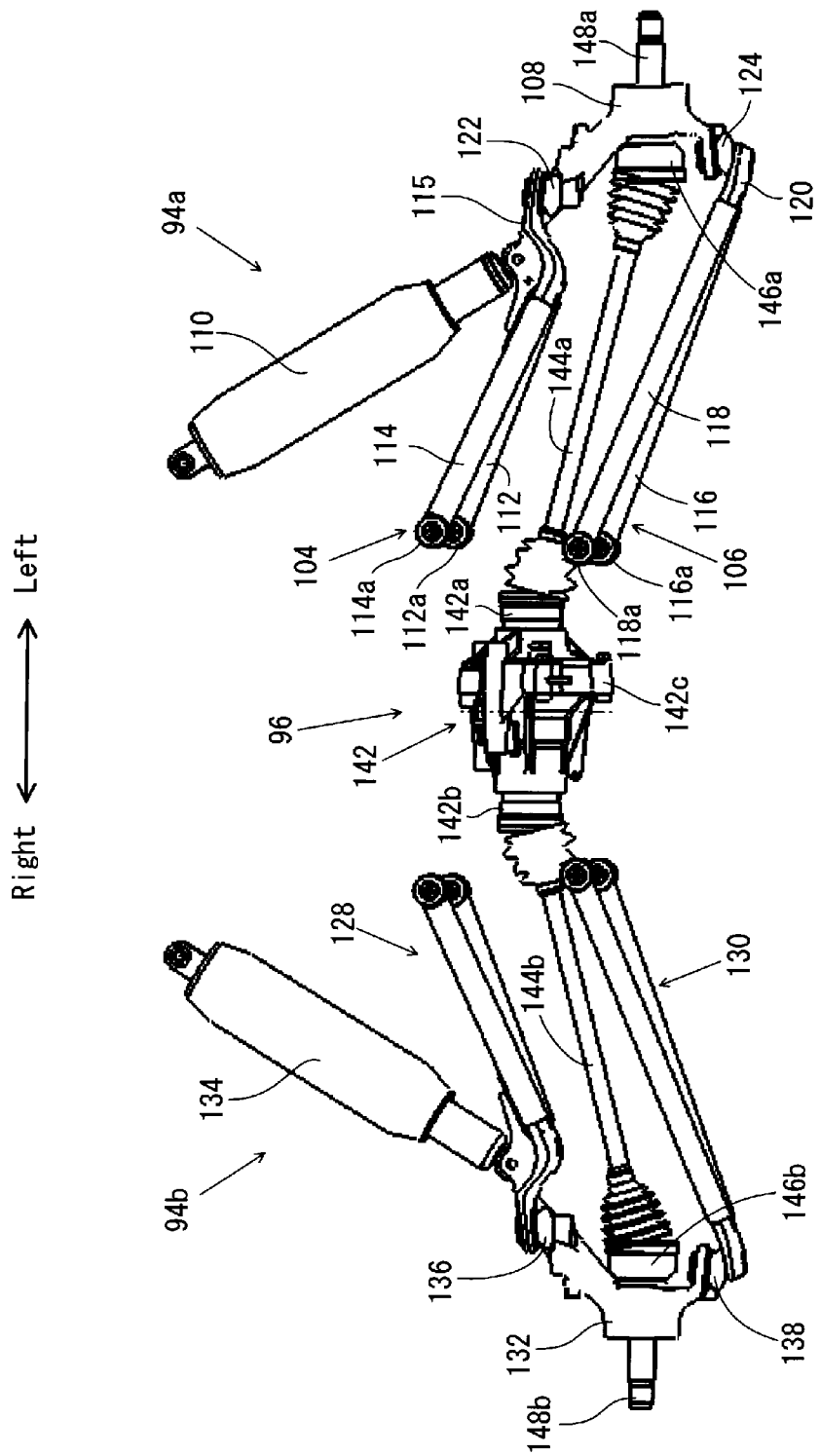
FIG. 11 is a front view showing the pair of suspension assemblies for front wheels and the rotation transmission portion for the front wheels.

Referring to FIG. 10 and FIG. 11, the suspension assembly 94a includes an upper arm 104, a lower arm 106, a knuckle arm 108 and a shock absorber 110. The upper arm 104 and the lower arm 106 are provided by A arms, for example.

Referring to FIG. 11, the upper arm 104 includes a rear arm portion 112 which includes a first end portion 112a; a front arm portion 114 which includes a second end portion 114a and is at a more forward position than the rear arm portion 112; and a connecting portion 115 which connects the rear arm portion 112 and the front arm portion 114 to each other. The first end portion 112a is an end region (right end region in the present preferred embodiment) of the rear arm portion 112, whereas the second end portion 114a is an end region (right end region in the present preferred embodiment) of the front arm portion 114. The connecting portion 115 connects another end region (left end region in the present preferred embodiment) of the rear arm portion 112 and another end region (left end region in the present preferred embodiment) of the front arm portion 114 to each other.

The lower arm 106 includes a rear arm portion 116 which includes a first end portion 116a; a front arm portion 118 which includes a second end portion 118a and is at a more forward position than the rear arm portion 116; and a connecting portion 120 which connects the rear arm portion 116 and the front arm portion 118 to each other. The first end portion 116a is an end region (right end region in the present preferred embodiment) of the rear arm portion 116, whereas the second end portion 118a is an end region (right end region in the present preferred embodiment) of the front arm portion 118. The connecting portion 120 connects another end region (left end region in the present preferred embodiment) of the rear arm portion 116 and another end region (left end region in the present preferred embodiment) of the front arm portion 118 to each other.

Figure 9:
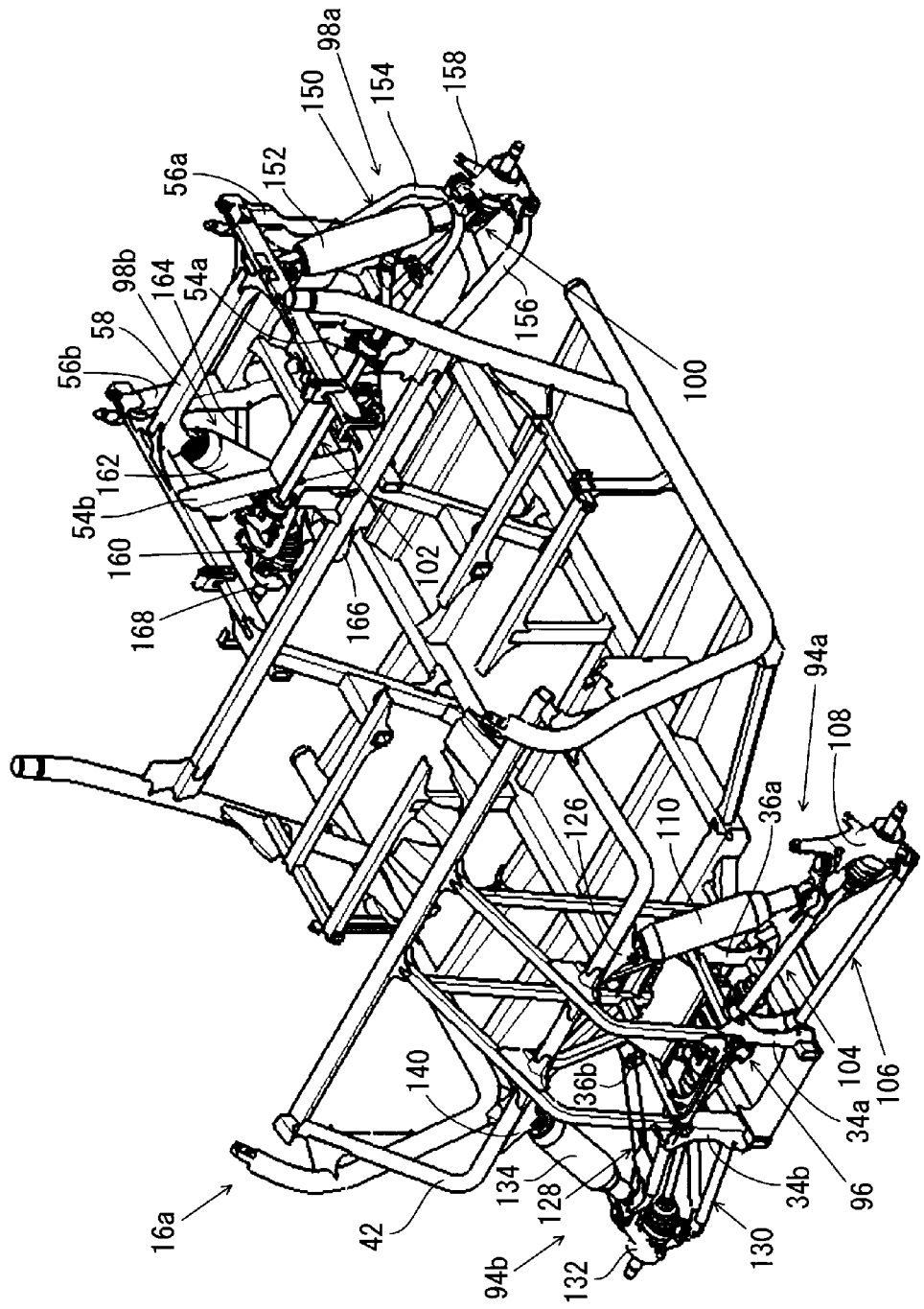
FIG. 9 is a perspective view of the main frame portion, a pair of suspension assemblies for front wheels, a rotation transmission portion for the front wheels, a pair of suspension assemblies for rear wheels, and a rotation transmission portion for the rear wheels.

Referring to FIG. 9, the upper arm 104 is supported by the support frame portions 34a, 36a pivotably in an up-down direction. More specifically, referring to FIG. 11, the first end portion 112a of the rear arm portion 112 is pivotably supported at an upper end region of the support frame portion 36a (see FIG. 9), whereas the second end portion 114a of the front arm portion 114 is pivotably supported at an upper end region of the support frame portion 34a (see FIG. 9).

Referring to FIG. 9, the lower arm 106 is supported by the support frame portions 34a, 36a pivotably in an up-down direction at a lower position than the upper arm 104. More specifically, referring to FIG. 11, the first end portion 116a of the rear arm portion 116 is pivotably supported at a lower end region of the support frame portion 36a (see FIG. 9), whereas the second end portion 118a of the front arm portion 118 is pivotably supported at a lower end region of the support frame portion 34a (see FIG. 9).

The connecting portion 115 of the upper arm 104 is connected to an upper end region of the knuckle arm 108 via a ball joint 122, whereas the connecting portion 120 of the lower arm 106 is connected to a lower end region of the knuckle arm 108 via a ball joint 124. Thus, the upper arm 104 and the lower arm 106 are pivotable in an up-down direction with respect to the knuckle arm 108. Also, the knuckle arm 108 is pivotable in a fore-aft direction with respect to the upper arm 104 and the lower arm 106.

The shock absorber 110 has a lower end region supported pivotably in a left-right direction by the upper arm 104 (the connecting portion 115). Referring to FIG. 9, the shock absorber 110 has an upper end region supported pivotably in a left-right direction by the U-shaped or substantially U-shaped frame portion 42 via a support member 126. Referring to FIG. 6, the support member 126 has a shape of an inverted letter of U or substantially in a shape of an inverted letter of U in a side view, and is fixed to the U-shaped or substantially U-shaped frame portion 42.

Referring to FIG. 10 and FIG. 11, the suspension assembly 94b is symmetrical to the suspension assembly 94a in a left-right direction, and includes an upper arm 128, a lower arm 130, a knuckle arm 132, and a shock absorber 134. The knuckle arm 132 is connected to the upper arm 128 and the lower arm 130 via ball joints 136, 138.

The shock absorber 134 has a lower end region supported by the upper arm 128 pivotably in a left-right direction. Referring to FIG. 9, the shock absorber 134 has an upper end region supported pivotably in a left-right direction by the U-shaped or substantially U-shaped frame portion 42 via a support member 140. Like the support member 126, the support member 140 has a shape of an inverted letter of U in a side view, and is fixed to the U-shaped or substantially U-shaped frame portion 42.

Referring to FIG. 10 and FIG. 11, the rotation transmission portion 96 includes a differential device 142, a pair of drive shafts 144a, 144b, a pair of constant-velocity joints 146a, 146b, and a pair of axles 148a, 148b. The differential device 142 is between the suspension assembly 94a and the suspension assembly 94b in the width direction of the vehicle 10. The differential device 142 is supported by the main frame portion 16a. The differential device 142 is connected to the engine 178 (see FIG. 13) which will be described later, via a propeller shaft 180 (see FIG. 13) which will be described later.

Referring to FIG. 11, the differential device 142 includes a pair of constant-velocity joints 142a, 142b and a main body portion 142c. The constant-velocity joint 142a is on a left end region of the main body portion 142c, whereas the constant-velocity joint 142b is on a right end region of the main body portion 142c. The drive shafts 144a, 144b extend in a left-right direction, to connect the constant-velocity joints 142a, 142b with the constant-velocity joints 146a, 146b. More specifically, the drive shaft 144a extends obliquely in a leftward and downward direction from the constant-velocity joint 142a and is connected to the constant-velocity joint 146a, whereas the drive shaft 144b extends obliquely in a rightward and downward direction from the constant-velocity joint 142b and is connected to the constant-velocity joint 146b. The drive shaft 144a passes below the upper arm 104 and above the lower arm 106, whereas the drive shaft 144b passes below the upper arm 128 and above the lower arm 130. In the present preferred embodiment, in a front view, the drive shaft 144a passes between the upper arm 104 and the lower arm 106, whereas the drive shaft 144b passes between the upper arm 128 and the lower arm 130.

The constant-velocity joint 146a and the axle 148a are connected to each other and are supported rotatably by the knuckle arm 108. The constant-velocity joint 146b and the axle 148b are connected to each other and are supported rotatably by the knuckle arm 132. The axle 148a supports the left front wheel 12 (see FIG. 1), whereas the axle 148b supports the right front wheel 12 (see FIG. 1).

The suspension assemblies 98a, 98b and the rotation transmission portion 100 can be any known component, so the suspension assemblies 98a, 98b and the rotation transmission portion 100 will be described only briefly.

Figure 12:
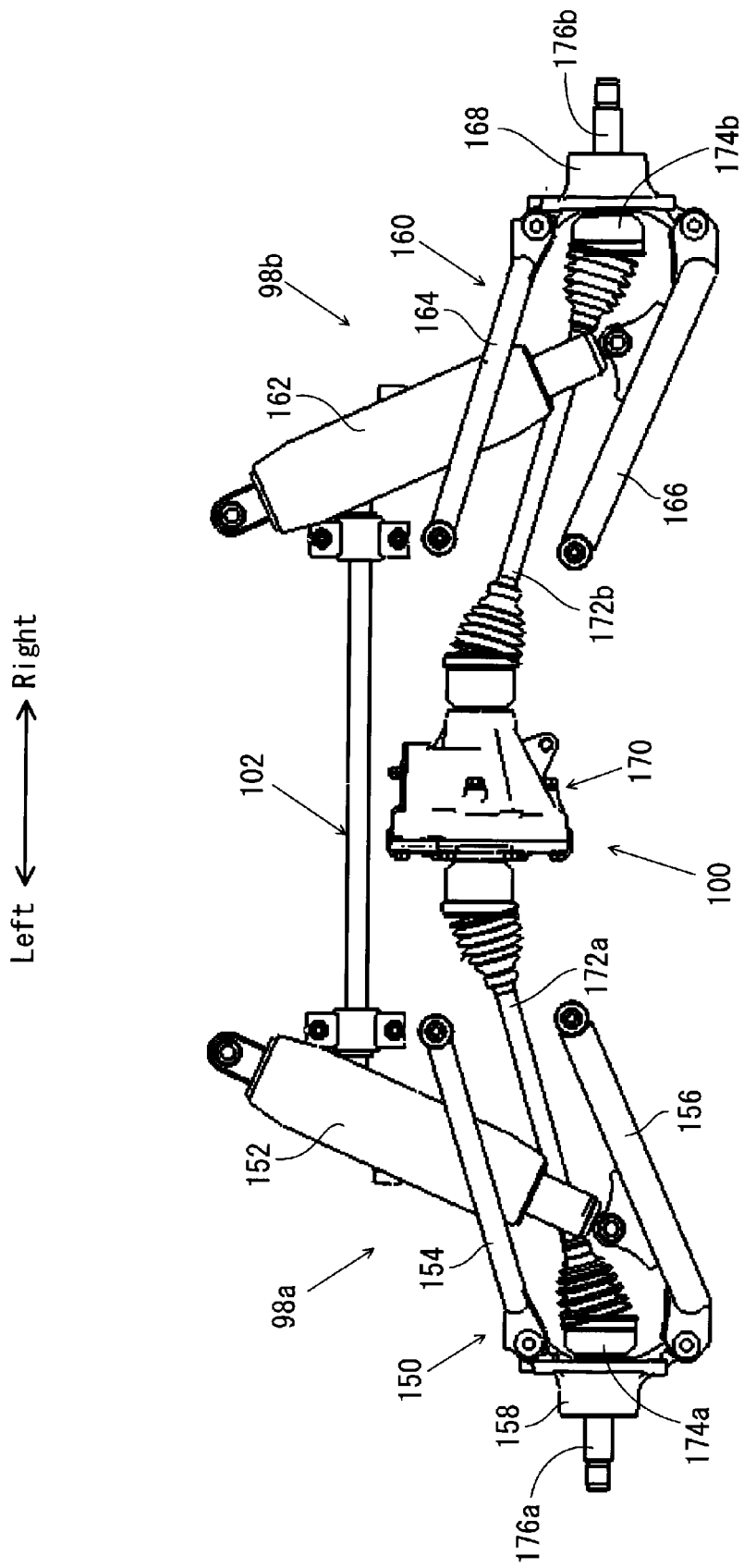
FIG. 12 is a rear view showing the pair of suspension assemblies for rear wheels, the rotation transmission portion for the rear wheels, and a rear stabilizer.

Referring to FIG. 10 and FIG. 12, the suspension assembly 98a includes an arm portion 150 and a shock absorber 152. In the present preferred embodiment, the arm portion 150 includes an upper arm 154, a lower arm 156 and a knuckle arm 158. Referring to FIG. 9, the upper arm 154 is supported by the support frame portions 54a, 56a pivotably in an up-down direction. The lower arm 156 is supported by the support frame portions 54a, 56a pivotably in an up-down direction at a lower position than the upper arm 154. More specifically, the upper arm 154 is supported at substantially intermediate regions in an up-down direction of the support frame portions 54a, 56a, whereas the lower arm 156 is supported by lower end regions of the support frame portions 54a, 56a. The shock absorber 152 connects the main frame portion 16a and the arm portion 150 (lower arm 156 in the present preferred embodiment) to each other. More specifically, the shock absorber 152 has an upper end region supported pivotably by an end region (left end region in the present preferred embodiment) of the cross member 58, whereas the shock absorber 152 has a lower end region supported pivotably by the lower arm 156.

Referring to FIG. 10 and FIG. 12, the suspension assembly 98b is symmetrical with the suspension assembly 98a in a left-right direction, and includes an arm portion 160 and a shock absorber 162. In the present preferred embodiment, the arm portion 160 includes an upper arm 164, a lower arm 166 and a knuckle arm 168. Referring to FIG. 9, the upper arm 164 is supported by the support frame portions 54b, 56b pivotably in an up-down direction. The lower arm 166 is supported by the support frame portions 54b, 56b pivotably in an up-down direction at a lower position than the upper arm 164. More specifically, the upper arm 164 is supported at substantially intermediate regions in an up-down direction of the support frame portions 54b, 56b, whereas the lower arm 166 is supported by lower end regions of the support frame portions 54b, 56b. The shock absorber 162 connects the main frame portion 16a and the arm portion 160 (lower arm 166 in the present preferred embodiment) to each other. More specifically, the shock absorber 162 has an upper end region supported pivotably by another end region (right end region in the present preferred embodiment) of the cross member 58, whereas the shock absorber 162 has a lower end region supported pivotably by the lower arm 166.

Referring to FIG. 10, the rear stabilizer 102 is at a more forward position than the shock absorbers 152, 162, and connects the arm portion 150 of the suspension assembly 98*a* and the arm portion 160 of the suspension assembly 98*b* to each other. In the present preferred embodiment, the rear stabilizer 102 connects the upper arm 154 and the upper arm 164 to each other.

Referring to FIG. 10 and FIG. 12, the rotation transmission portion 100 includes a differential device 170, a pair of drive shafts 172*a*, 172*b*, a pair of constant-velocity joints 174*a*, 174*b*, and a pair of axles 176*a*, 176*b*. The differential device 170 is between the suspension assembly 98*a* and the suspension assembly 98*b* in the width direction of the vehicle 10. The differential device 170 is supported by the main frame portion 16*a*. The differential device 170 is connected to the engine 178 (see FIG. 13) which will be described later, via a propeller shaft 182 (see FIG. 13) which will be described later.

The drive shafts 172*a*, 172*b* connects the differential device 170 with the constant-velocity joints 174*a*, 174*b*. The constant-velocity joint 174*a* and the axle 176*a* are connected to each other and are supported rotatably by the knuckle arm 158. The constant-velocity joint 174*b* and the axle 176*b* are connected to each other and are supported rotatably by the knuckle arm 168. The axle 176*a* supports the left rear wheel 14 (see FIG. 5), whereas the axle 176*b* supports the right rear wheel 14 (see FIG. 5).

Figure 13:
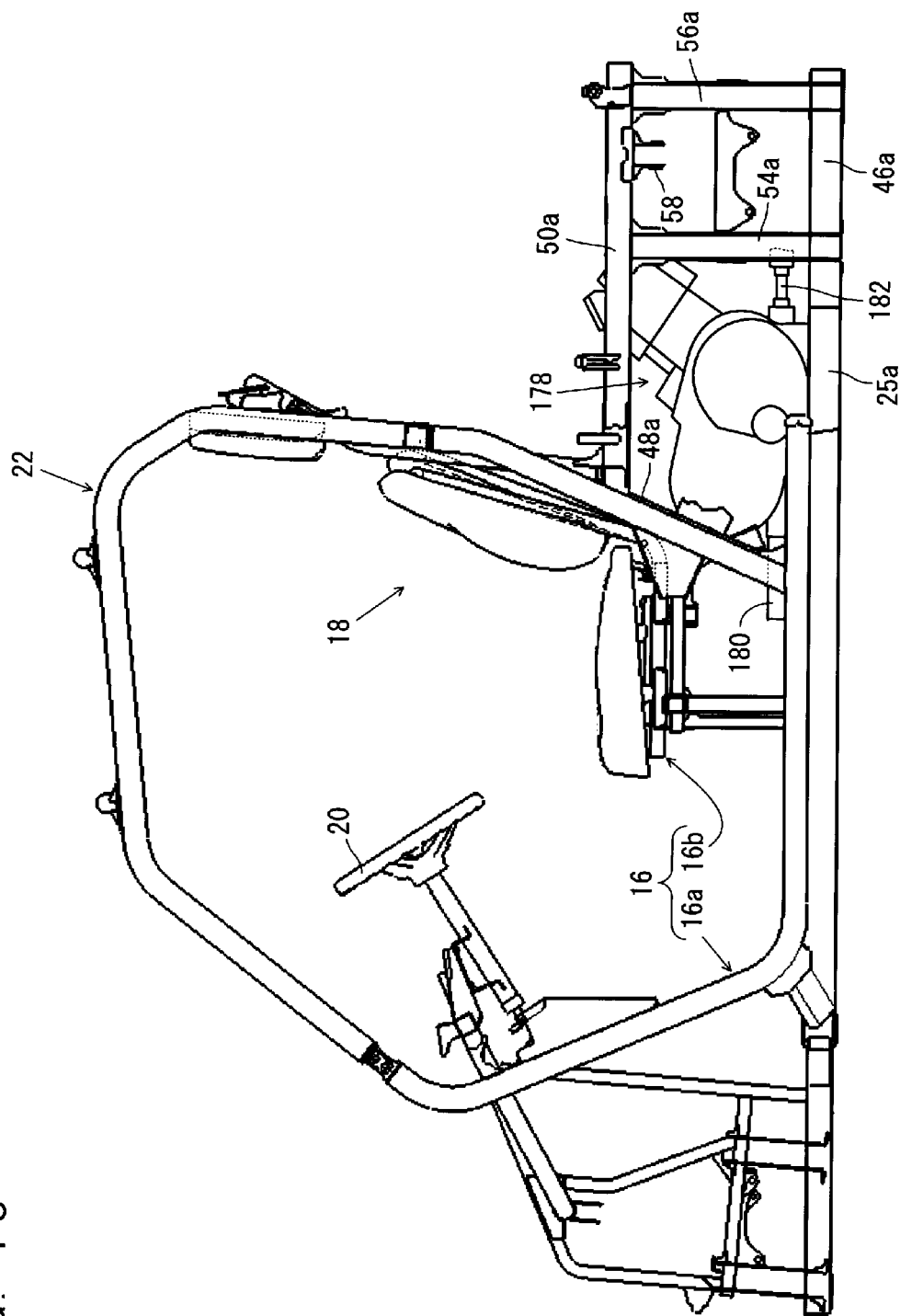
FIG. 13 is a side view showing the frame portion, the seat unit, the steering wheel, the roll-over protection cage, an engine and a pair of propeller shafts.
Figure 14:
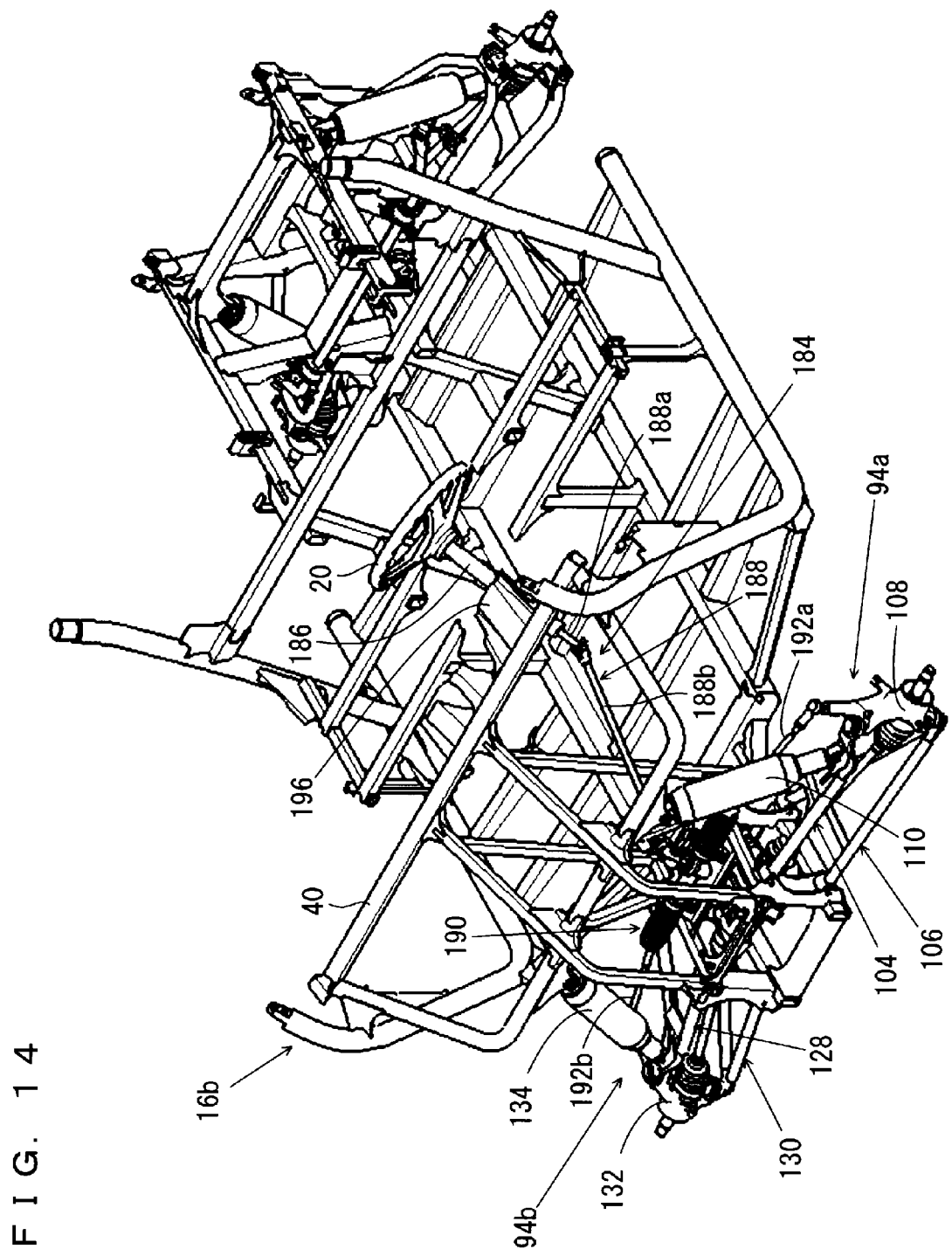
FIG. 14 is a perspective view of the main frame portion, showing a state where the steering wheel and a transfer mechanism are mounted thereon.
Figure 15:
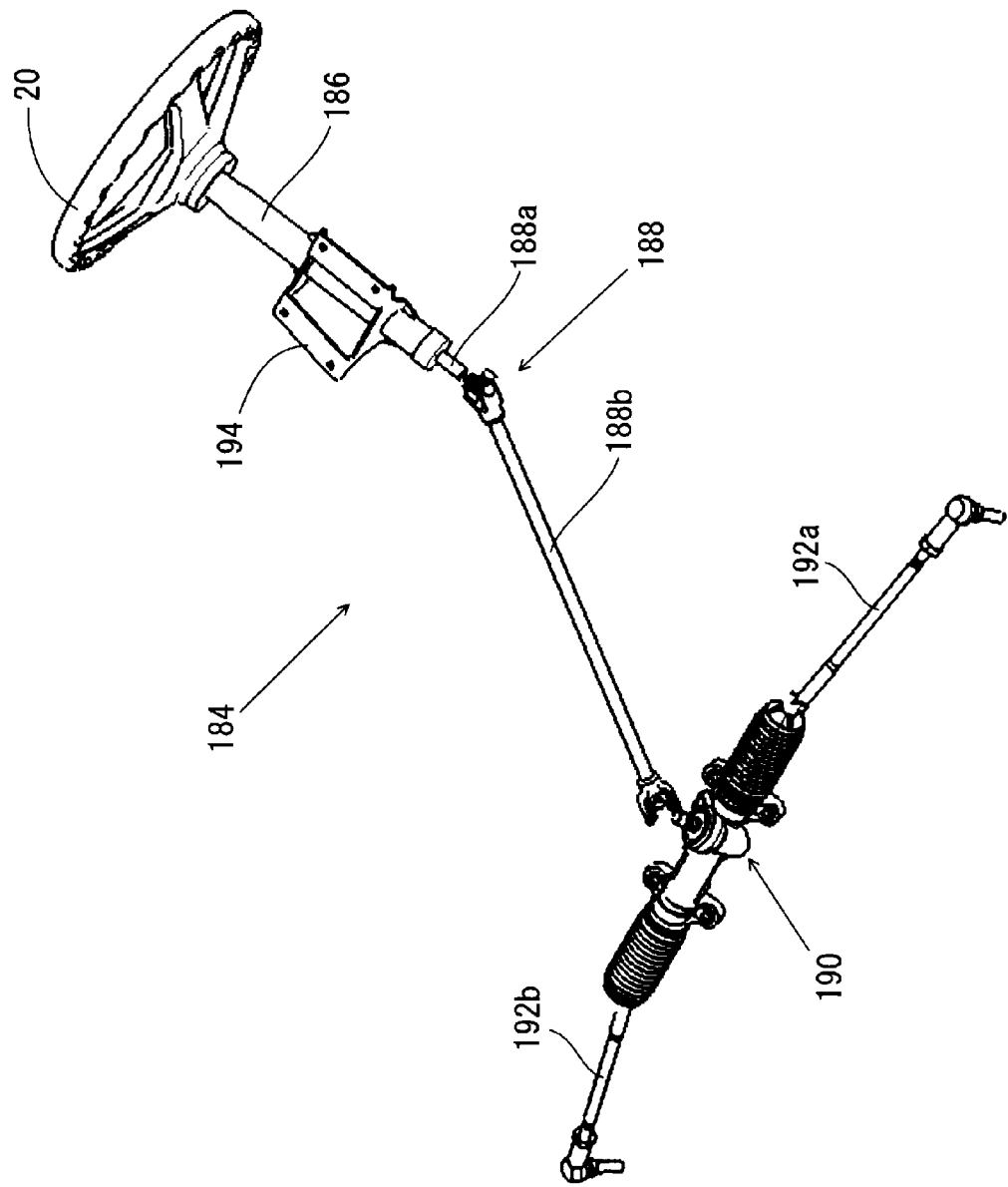
FIG. 15 is a perspective view of the steering wheel and the transfer mechanism.
Figure 16:
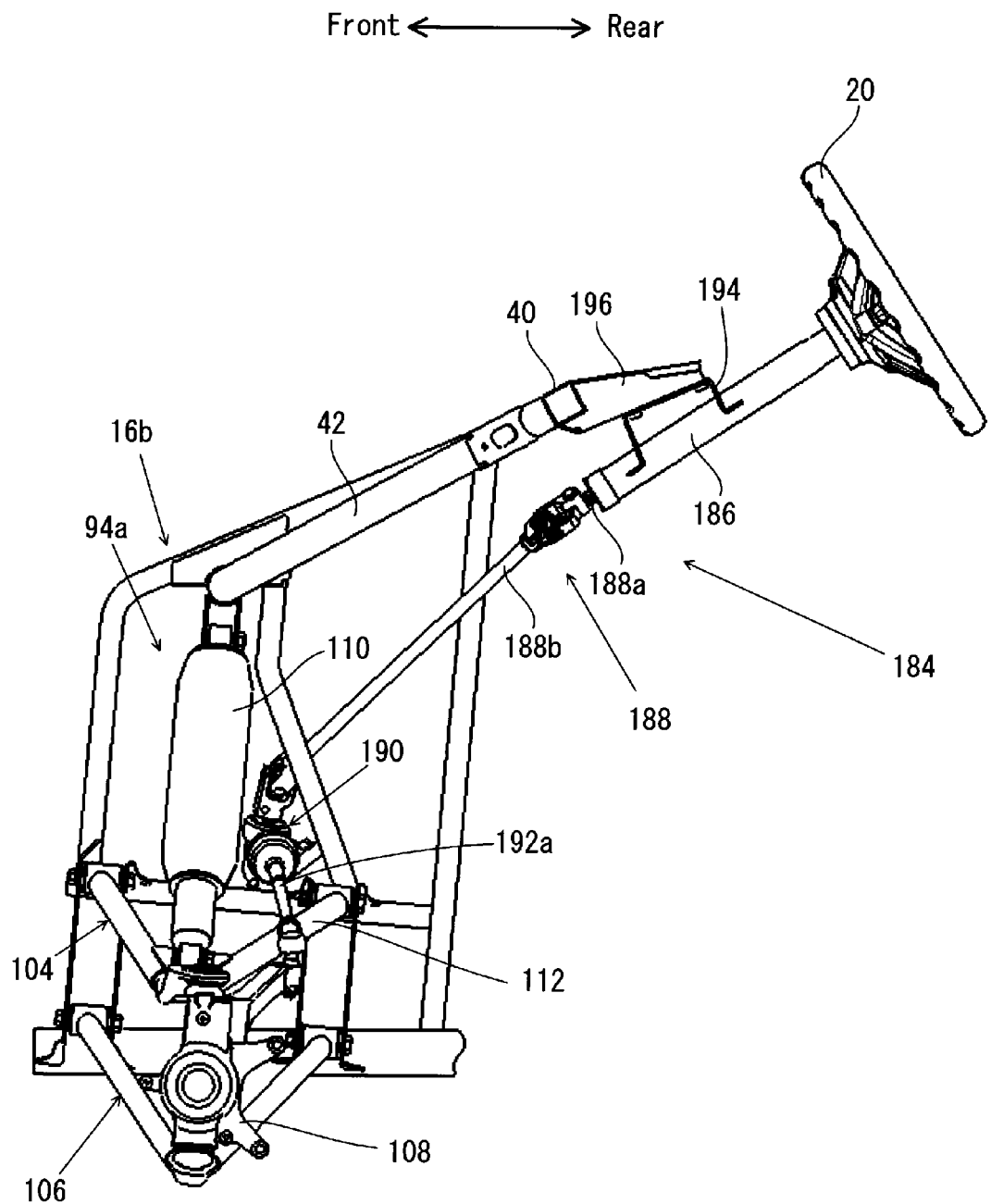
FIG. 16 is a side view showing an arrangement of the transfer mechanism and a surrounding area.
Figure 17:
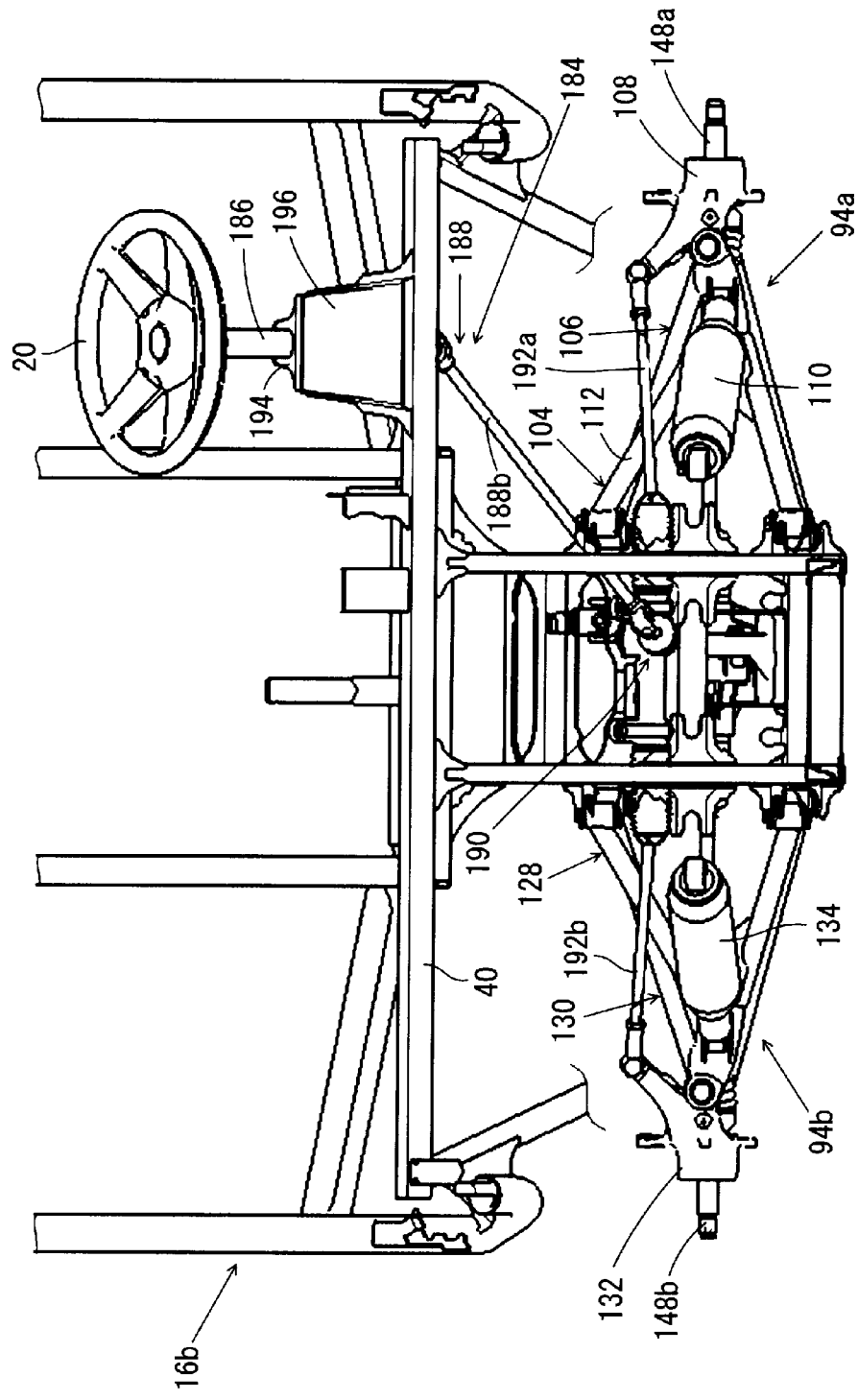
FIG. 17 is a plan view showing the arrangement of the transfer mechanism and a surrounding area.

Referring to FIG. 13, the engine 178 is supported at a rearward region of the main frame portion 16*a*. Referring to FIG. 7 and FIG. 13, a majority of the engine 178 is located within a space surrounded by the side frame portions 25*a*, 25*b*, the side frame portions 46*a*, 46*b*, the support frame portions 48*a*, 48*b*, the side frame portions 50*a*, 50*b*, and the support frame portions 54*a*, 54*b*. In the present preferred embodiment, at least portion of the engine 178 is at a more rearward position than the roll-over protection cage 22.

Referring to FIG. 13, the propeller shaft 180 extends forward from a lower end region of the engine 178, whereas the propeller shaft 182 extends rearward from a lower end region of the engine 178. In order to avoid complication in the drawing, the propeller shaft 180 and the propeller shaft 182 are illustrated only partially in FIG. 13.

The propeller shaft 180 is connected to the differential device 142 (see FIG. 10), whereas the propeller shaft 182 is connected to the differential device 170 (see FIG. 10). Referring to FIG. 11 and FIG. 13, rotation from the engine 178 is transmitted by the propeller shaft 180, the differential device 142, the drive shafts 144*a*, 144*b*, the constant-velocity joints 146*a*, 146*b*, and the axles 148*a*, 148*b*, to the pair of front wheels 12. Thus, the pair of front wheels 12 are rotated. Also, referring to FIG. 12 and FIG. 13, rotation from the engine 178 is transmitted by the propeller shaft 182, the differential device 170, the drive shafts 172*a*, 172*b*, the constant-velocity joints 174*a*, 174*b*, and the axles 176*a*, 176*b*, to the pair of rear wheels 14. Thus, the pair of rear wheels 14 are rotated.

Referring to FIG. 14 through FIG. 17, the vehicle 10 further includes a transfer mechanism 184 which transmits movements of the steering wheel 20 to the pair of front wheels 12. The transfer mechanism 184 can be known rack and pinion type transfer mechanisms, for example. Therefore, the transfer mechanism 184 will be described only briefly. The transfer mechanism 184 includes a steering column portion 186, a steering shaft portion 188, a rack-and-pinion portion 190 and a pair of tie rods 192*a*, 192*b*.

The steering column portion 186 is hollow, rotatably supporting the steering wheel 20. The steering column portion 186 is supported by a cross member 40 of the frame portion 16 via brackets 194, 196.

The steering shaft portion 188 includes a first shaft 188*a* and a second shaft 188*b*. The first shaft 188*a* is inserted into the steering column portion 186 rotatably. The first shaft 188*a* has an upper end region (not illustrated) connected to the steering wheel 20. The first shaft 188*a* has a lower end region connected to an upper end region of the second shaft 188*b*.

The second shaft 188*b* has a lower end region connected to the rack-and-pinion portion 190. Since the rack-and-pinion portion 190 can be known rack-and-pinion portion, the rack-and-pinion portion 190 will not be described in any more detail. The tie rods 192*a*, 192*b* pass behind the shock absorbers 110, 134 and above the upper arms 104, 128, to connect the rack-and-pinion portion 190 with the knuckle arms 108, 132.

Movement of the steering wheel 20 is transmitted through the steering shaft portion 188, the rack-and-pinion portion 190 and the pair of tie rods 192*a*, 192*b*, to the knuckle arms 108, 132. Then the knuckle arms 108, 132 pivots in a left-right direction, to steer the pair of front wheels 12.

Figure 18:
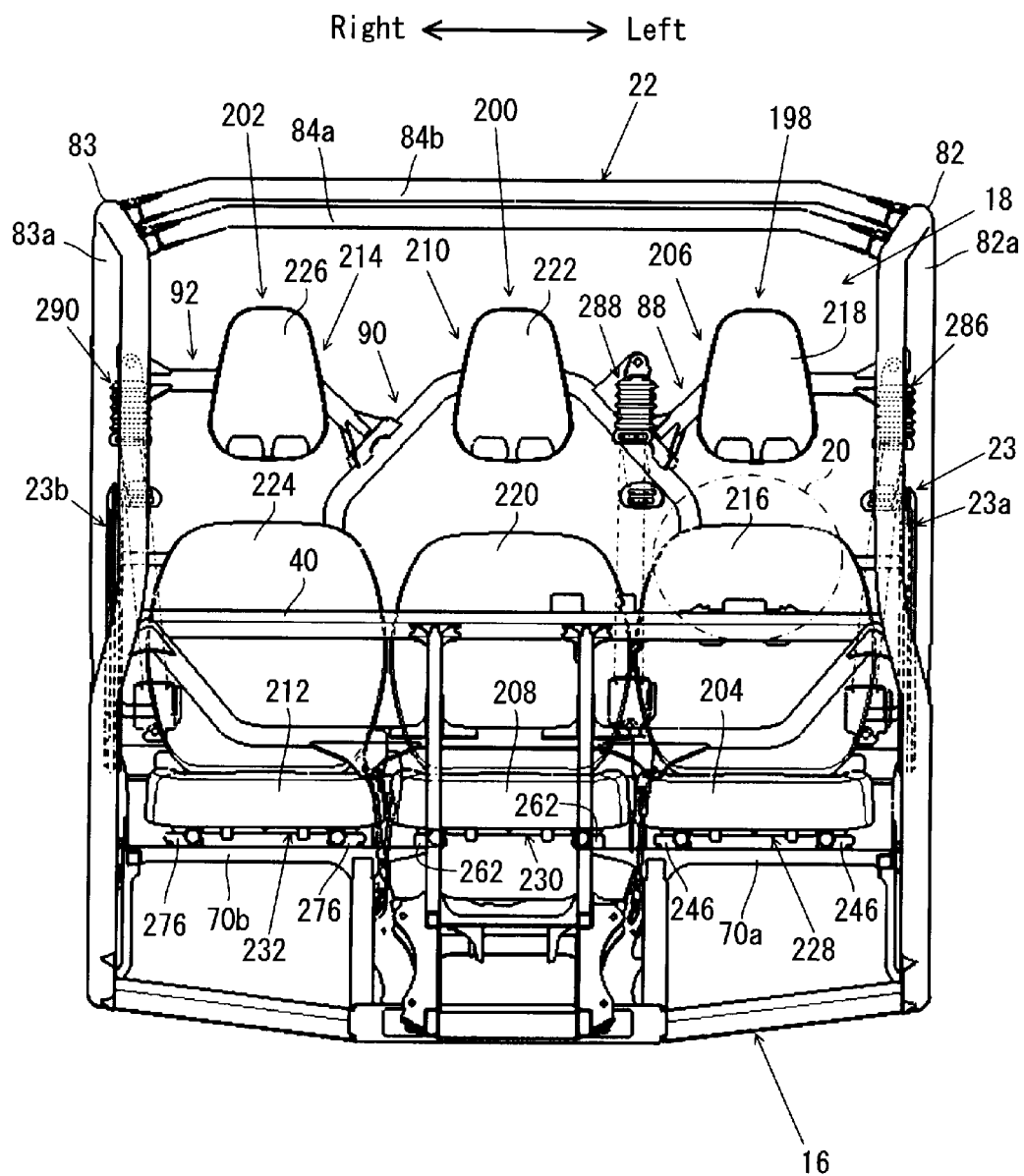
FIG. 18 is a front view showing the frame portion, the seat unit, the roll-over protection cage and a shoulder bolster portion.
Figure 19:
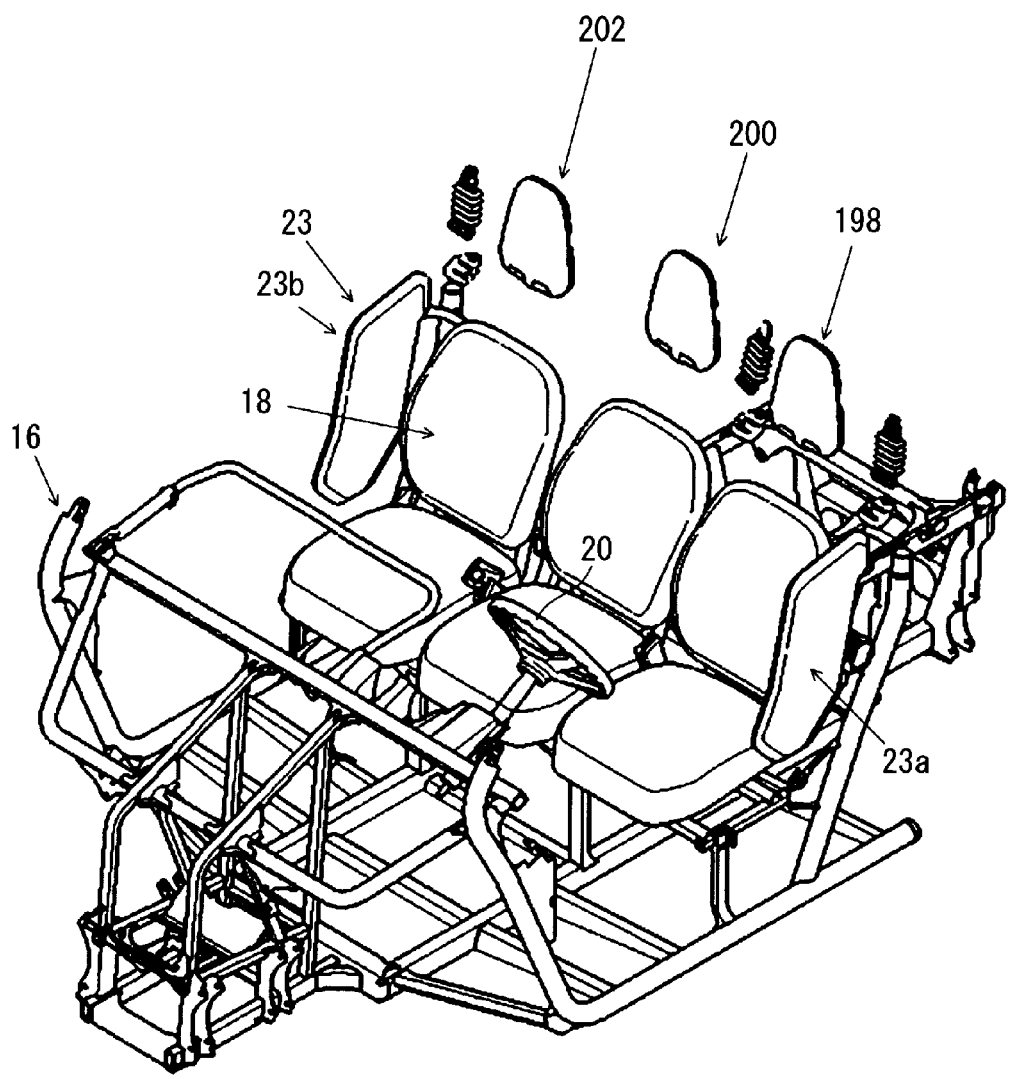
FIG. 19 is a perspective view showing the frame portion, the seat unit and the shoulder bolster portion.

Referring to FIG. 18 through FIG. 21, the seat unit 18 includes a plurality (for example, three in the present preferred embodiment) of seat portions 198, 200, 202 arranged side by side in this order in the width direction of the vehicle 10. In the width direction of the vehicle 10, the seat portion 200 is in the middle of the seat unit 18. In other words, the seat portion 200 is adjacent to the seat portion 198 and is adjacent to the seat portion 202 in the width direction of the vehicle 10. When viewed from the seat portion 200, the seat portion 202 is on the side away from the seat portion 198. Referring to FIG. 18 and FIG. 19, the steering wheel 20 is in front of the seat portion 198. Specifically, in the present preferred embodiment, the seat portion 198 is a seat portion for the driver, whereas the seat portions 200, 202 are seat portions for passengers.

Figure 20:
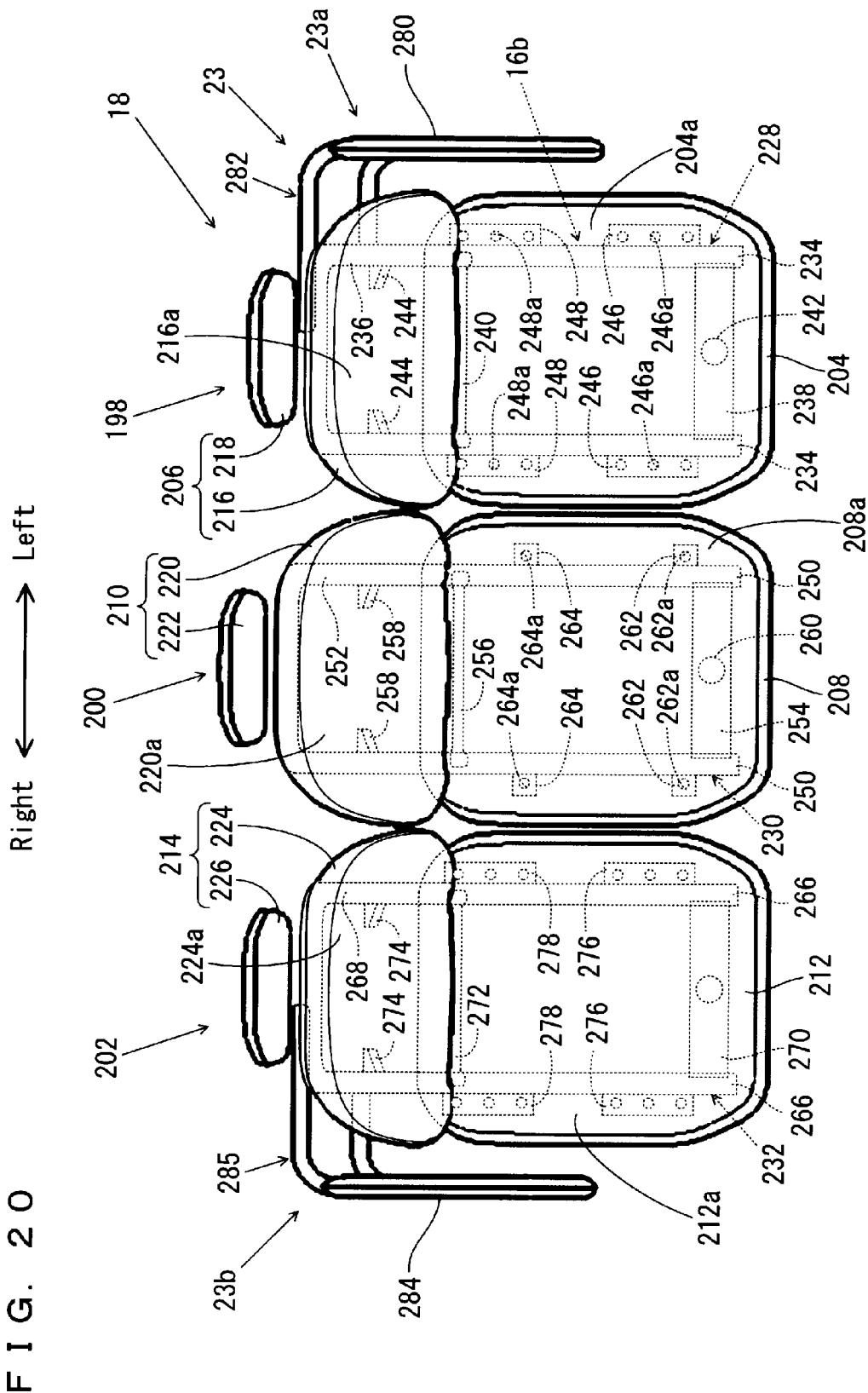
FIG. 20 is a plan view showing a seat frame portion, the seat unit and the shoulder bolster portion.
Figure 21:
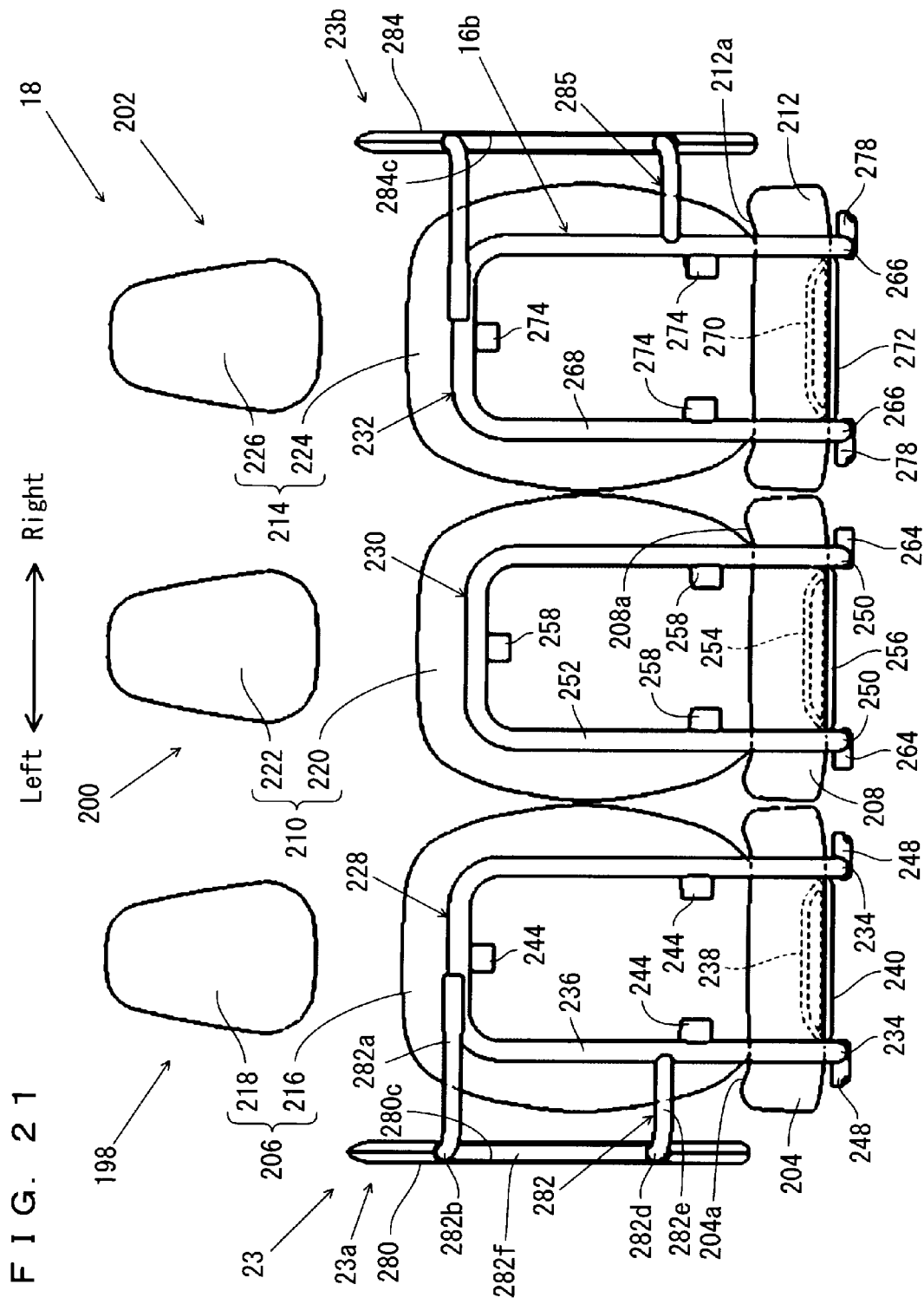
FIG. 21 is a rear view showing the seat frame portion, the seat unit and the shoulder bolster portion.

Referring to FIG. 20 and FIG. 21, the seat portion 198 includes a seat bottom portion 204 which supports a human body from below, and a back support portion 206 which supports the human body from behind. Likewise, the seat portion 200 includes a seat bottom portion 208 and a back support portion 210, whereas the seat portion 202 includes a seat bottom portion 212 and a back support portion 214.

The back support portion 206 includes a seat back portion 216 which supports the back of the human body, and a headrest portion 218 which supports the head of the human body. Likewise, the back support portion 210 includes a seat back portion 220 and a headrest portion 222, whereas the back support portion 214 includes a seat back portion 224 and a headrest portion 226.

In the present preferred embodiment, the seat portion 198 represents the first seat portion, the seat portion 200 represents the second seat portion, and the seat portion 202 represents the third seat portion. Also, the headrest portion 218 represents the first headrest portion, the headrest portion 222 represents the second headrest portion, and the headrest portion 226 represents the third headrest portion.

The seat bottom portion 204 includes a seat surface 204*a* which supports the buttocks of the human body, the seat bottom portion 208 includes a seat surface 208*a* which supports the buttocks of the human body, and the seat bottom portion 212 includes a seat surface 212*a* which supports the buttocks of the human body. Referring to FIG. 20, the seat back portion 216 includes a backrest surface 216*a* which supports the back of the human body, the seat back portion 220 includes a backrest surface 220*a* which supports the back of the human body, and the seat back portion 224 includes a backrest surface 224*a* which supports the back of the human body. In the present preferred embodiment, each of the seat surfaces 204a, 208a, 212a includes a downward receding recess in its middle region in a left-right direction. Each of the backrest surfaces 216a, 220a, 224a has a backward receding recess in its middle region in a left-right direction. The seat unit 18 is supported by the seat frame portion 16b, with each of the backrest surfaces 216a, 220a, 224a tilted backward.

Referring to FIG. 20 and FIG. 21, the seat frame portion 16b includes a seat frame 228 which supports the seat portion 198, a seat frame 230 which supports the seat portion 200, and a seat frame 232 which supports the seat portion 202. In the present preferred embodiment, the seat frame 228 supports the seat bottom portion 204 and the seat back portion 216 of the seat portion 198, the seat frame 230 supports the seat bottom portion 208 and the seat back portion 220 of the seat portion 200, and the seat frame 232 supports the seat bottom portion 212 and the seat back portion 224 of the seat portion 202.

Referring to FIG. 5, as has been described earlier, the headrest portion 218 of the seat portion 198 is attached to the mounting portion 88b of the cross member portion 86, the headrest portion 222 of the seat portion 200 is attached to the mounting portion 90b of the cross member portion 86, and the headrest portion 226 of the seat portion 202 is attached to the mounting portion 92b of the cross member portion 86. Referring to FIG. 8, as has been described earlier, the mounting portion 90b is at a more rearward position than the mounting portions 88b, 92b. Therefore, referring to FIG. 20, the headrest portion 222 is at a more rearward position than the headrest portions 218, 226.

Referring to FIG. 20 and FIG. 21, the seat frame 228 includes a pair of bottom frame portions 234 extending in a fore-aft direction and a back frame portion 236 extending in an up-down direction. In the present preferred embodiment, the pair of bottom frame portions 234 and the back frame portion 236 are integral with each other. The back frame portion 236 is shaped in an inverted letter of U or substantially in an inverted letter of U in a rear view, extending obliquely in an upwardly rearward direction from rear ends of the pair of bottom frame portions 234. To the back frame portion 236, a connecting member 282, which will be described later, of the shoulder bolster portion 23 is fixed.

Figure 22:
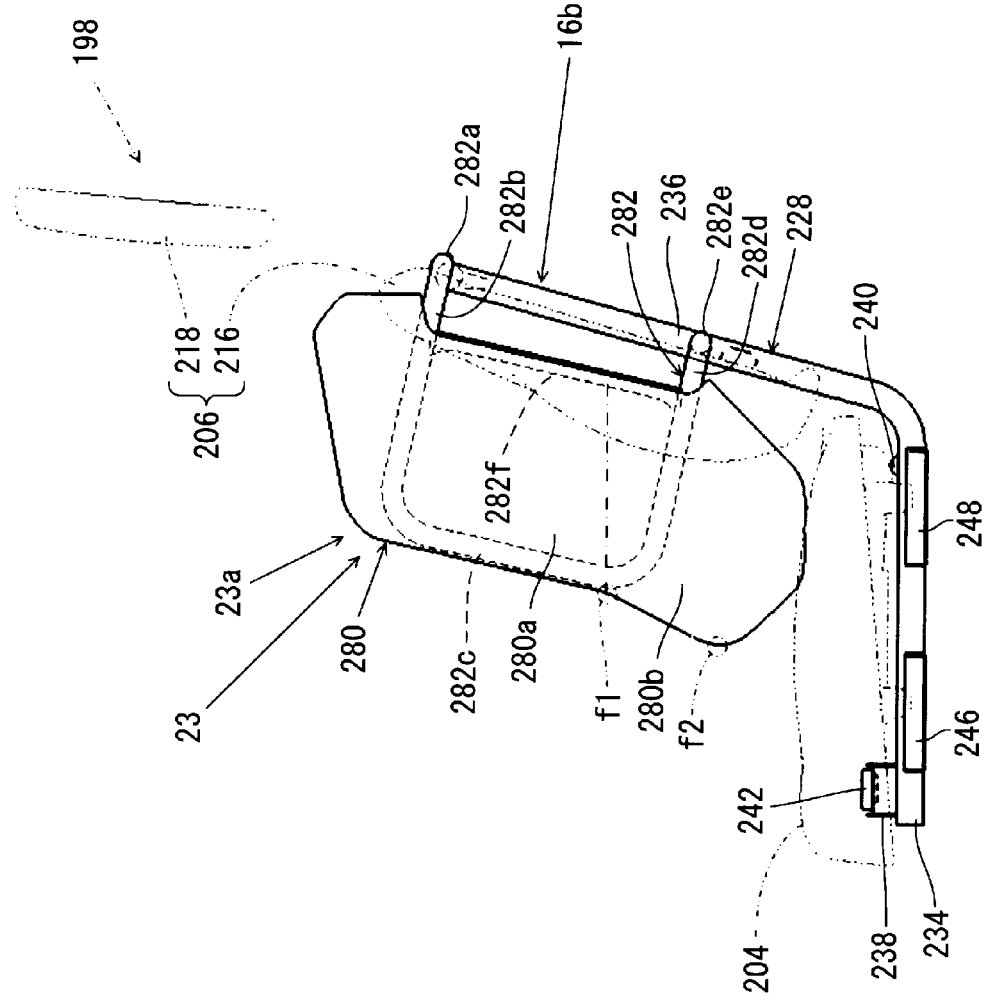
FIG. 22 is a side view (from a left side) showing the seat frame portion and the shoulder bolster portion.

The seat frame 228 further has a cross member 238 which connects forward end regions of the pair of bottom frame portions 234 to each other, and a cross member 240 which connects rearward end regions of the pair of bottom frame portions 234 to each other. Referring to FIG. 20 and FIG. 22, the seat bottom portion 204 has its forward end region attached to the cross member 238 via a mounting member 242. Referring to FIG. 20 through FIG. 22, the seat bottom portion 204 has its rearward end region supported by the cross member 240. Thus, the seat bottom portion 204 is supported by the pair of bottom frame portions 234 via the cross members 238, 240.

Referring to FIG. 20 and FIG. 21, the seat frame 228 further has a plurality (three in the present preferred embodiment, only two are shown in FIG. 20) of brackets 244 fixed to the back frame portion 236. The seat back portion 216 is attached to the plurality of brackets 244. Thus, the seat back portion 216 is supported by the back frame portion 236.

Referring to FIG. 20 through FIG. 22, the seat frame 228 further includes a pair of brackets 246 and a pair of brackets 248. Each of the brackets 246 is fixed to a forward region of the bottom frame portion 234, whereas each of the brackets 248 is fixed to a rearward region of the bottom frame portion 234. Referring to FIG. 20, each bracket 246 has a plurality (for example, three in the present preferred embodiment) of through-holes 246a penetrating in an up-down direction, whereas each bracket 248 has a plurality (for example, three in the present preferred embodiment) of through-holes 248a penetrating in an up-down direction.

Referring to FIG. 8, FIG. 18 and FIG. 20, the pair of brackets 246 are fixed to the support frame portion 70a of the frame portion 16, whereas the pair of brackets 248 are fixed to the support frame portion 78a of the frame portion 16. Thus, the seat frame 228 is fixed to the support frame portions 70a, 78a. Specifically, the seat portion 198 (the seat bottom portion 204 and the seat back portion 216 as components of the seat portion 198, in the present preferred embodiment) is supported by the frame portion 16.

The support frame portion 70a has a pair of through-holes (not illustrated) at positions corresponding to the pair of brackets 246, whereas the support frame portion 78a has a pair of through-holes (not illustrated) at positions corresponding to the pair of brackets 248. In the present preferred embodiment, the brackets 246 and the support frame portion 70a are connected to each other by, e.g., inserting a fastener (such as a bolt, for example) through one of the through-holes 246a in each bracket 246 and a corresponding one in the support frame portion 70a. Likewise, the bracket 248 and the support frame portion 78a are connected to each other by, e.g., inserting a fastener (such as a bolt, for example) through one of the through-holes 248a in each bracket 248 and a corresponding one in the support frame portion 78a.

In the present preferred embodiment, one through-hole 246a is appropriately selected from the three through-holes 246a in each bracket 246 for connection between the support frame portion 70a and the brackets 246. Likewise, one through-hole 248a is appropriately selected from the three through-holes 248a in each bracket 248 for connection between the support frame portion 78a and the brackets 248. Thus, the seat portion 198 (the seat bottom portion 204 and the seat back portion 216 as components of the seat portion 198 in the present preferred embodiment) is adjustable in its position in a fore-aft direction. In the present preferred embodiment, the headrest portion 218 of the seat portion 198 does not move in a fore-aft direction.

For example, the through-hole 246a at the most forward position in each of the brackets 246 and the through-hole 248a at the most forward position in each of the brackets 248 are used to connect the brackets 246, 248 to the support frame portions 70a, 78a. In this case, the seat portion 198 (the seat bottom portion 204 and the seat back portion 216) is disposed at the most rearward position. Also, for example, the through-hole 246a at the most rearward position in each of the brackets 246 and the through-hole 248a at the most rearward position in each of the brackets 248 are used to connect the brackets 246, 248 to the support frame portions 70a, 78a. In this case, the seat portion 198 (the seat bottom portion 204 and the seat back portion 216) is disposed at the most forward position. In FIG. 6, solid lines show the seat bottom portion 204 and the seat back portion 216 disposed at their most rearward positions, whereas alternate long and short dash lines show the seat bottom portion 204 and the seat back portion 216 at their most forward positions. It should be noted here that the vehicle 10 may be arranged such that the seat portion 198 (seat frame 228) is slidable with respect to the main frame portion 16a in a fore-aft direction.

Referring to FIG. 20 and FIG. 21, the seat frame 230 includes a pair of bottom frame portions 250 extending in a fore-aft direction and a back frame portion 252 extending in an up-down direction. The pair of bottom frame portions 250 preferably have the same shape as the pair of bottom frame portions 234. The back frame portion 252 preferably has the same shape as the back frame portion 236 except that it is tilted more rearward than the back frame portion 236.

The seat frame 230 further includes a cross member 254 which is of the same design as the cross member 238, a cross member 256 which is of the same design as the cross member 240, and a plurality (for example, three in the present preferred embodiment, only two are shown in FIG. 20) of brackets 258 which preferably are of the same design as the plurality of brackets 244.

Referring to FIG. 20, the seat bottom portion 208 has its forward end region attached to the cross member 254 via a mounting member 260. The seat bottom portion 208 has its rearward end region supported by the cross member 256. Thus, the seat bottom portion 208 is supported by the pair of bottom frame portions 250 via the cross members 254, 256. Referring to FIG. 20 and FIG. 21, the seat back portion 220 is attached to the plurality of brackets 258. Thus, the seat back portion 220 is supported by the back frame portion 252.

Referring to FIG. 20 and FIG. 21, the seat frame 230 further includes a pair of brackets 262 and a pair of brackets 264. Each of the brackets 262 is fixed to a forward region of the bottom frame portion 250, whereas each of the brackets 264 is fixed to a rearward region of the bottom frame portion 250. Referring to FIG. 20, each of the brackets 262 has a through-hole 262a penetrating in an up-down direction, whereas each of the brackets 264 has a through-hole 264a penetrating in an up-down direction.

Referring to FIG. 18 and FIG. 20, the bracket 262 on the left side is fixed to a right end region of the support frame portion 70a with unillustrated fasteners (such as bolt and nut), for example, whereas the bracket 262 on the right side is fixed to a left end region of the support frame portion 70b with unillustrated fasteners, for example. Referring to FIG. 8 and FIG. 20, the bracket 264 on the left side is fixed to a right end region of the support frame portion 78a with unillustrated fasteners, for example, whereas the bracket 264 on the right side is fixed to a left end region of the support frame portion 78b with unillustrated fasteners for example. Thus, the seat frame 230 is fixed to the support frame portions 70a, 70b, 78a, 78b. Specifically, the seat portion 200 (the seat bottom portion 208 and the seat back portion 220 as components of the seat portion 200 in the present preferred embodiment) is supported by the frame portion 16.

As has been described earlier, the back frame portion 252 of the seat frame 230 tilts more rearward than the back frame portion 236 of the seat frame 228. For this reason, the seat back portion 220 which is supported by the back frame portion 252 has a greater rearward tilting angle than the seat back portion 216 which is supported by the back frame portion 236. More specifically, the backrest surface 220a of the seat back portion 220 tilts more rearward than the backrest surface 216a of the seat back portion 216.

Referring to FIG. 20 and FIG. 21, the seat frame 232 has the same arrangement as the seat frame 228, and includes a pair of bottom frame portions 266, a back frame portion 268, cross members 270, 272, a plurality of brackets 274, a pair of brackets 276 and a pair of brackets 278. The seat frame 232 supports the seat bottom portion 212 and the seat back portion 224. Also, referring to FIG. 8, FIG. 18 and FIG. 20, the brackets 276, 278 of the seat frame 232 are fixed to the support frame portions 70b, 78b. Thus, the seat portion 202 (the seat bottom portion 212 and the seat back portion 224 as components of the seat portion 202 in the present preferred embodiment) is supported by the frame portion 16. Referring to FIG. 20, a connecting member 285, which will be described later, of a shoulder bolster portion 23 is fixed to the back frame portion 268.

In the present preferred embodiment, the seat frame 232 is supported by the main frame portion 16a in a non-adjustable manner in a fore-aft direction.

Referring to FIG. 20, in the present preferred embodiment, the back frame portions 236, 252, 268 of the seat frame portion 16b are not adjustable in their rearward tilting angle. Therefore, the rearward tilting angle of the backrest surface 216a and the rearward tilting angle of the backrest surface 220a cannot be set to the same as each other in the vehicle 10. It should be noted here that the seat frame portion 16b may be constructed such that the back frame portions 236, 252, 268 are adjustable in their rearward tilting angle, for example. Even in this case, it is preferable that the seat frame portion 16b is designed so as not to allow the rearward tilting angle of the backrest surface 216a and the rearward tilting angle of the backrest surface 220a to be set to the same as each other.

Referring to FIG. 18 through FIG. 21, the shoulder bolster portion 23 includes a first portion 23a and a second portion 23b. In the width direction of the vehicle 10, at least a portion of the shoulder bolster portion 23 is on the outer side of the seat unit 18. Referring to FIG. 18, in the present preferred embodiment, in the width direction of the vehicle 10, the entire shoulder bolster portion 23 is located farther inward than the outermost portion of the roll-over protection cage 22. In other words, in a front view, the entire shoulder bolster portion 23 is located farther inward than the outer edge of the roll-over protection cage 22.

Referring to FIG. 20 through FIG. 22, the first portion 23a includes a first shoulder bolster member 280 and a connecting member 282. Referring to FIG. 20 and FIG. 21, the second portion 23b includes a second shoulder bolster member 284 and a connecting member 285. Each of the first shoulder bolster member 280 and the second shoulder bolster member 284 preferably includes a platy member, for example. Further, in the present preferred embodiment, each of the first shoulder bolster member 280 and the second shoulder bolster member 284 is provided by an elongated member which is elongated in an up-down direction. Each of the connecting member 282 and the connecting member 285 is preferably provided by a pipe member, for example. In the width direction of the vehicle 10, the first shoulder bolster member 280 and the second shoulder bolster member 284 are on the outer sides respectively of the seat unit 18. In the present preferred embodiment, in the width direction of the vehicle 10, the first shoulder bolster member 280 is on an outer side of the seat portion 198, whereas the second shoulder bolster member 284 is on an outer side of the seat portion 202.

Figure 23:
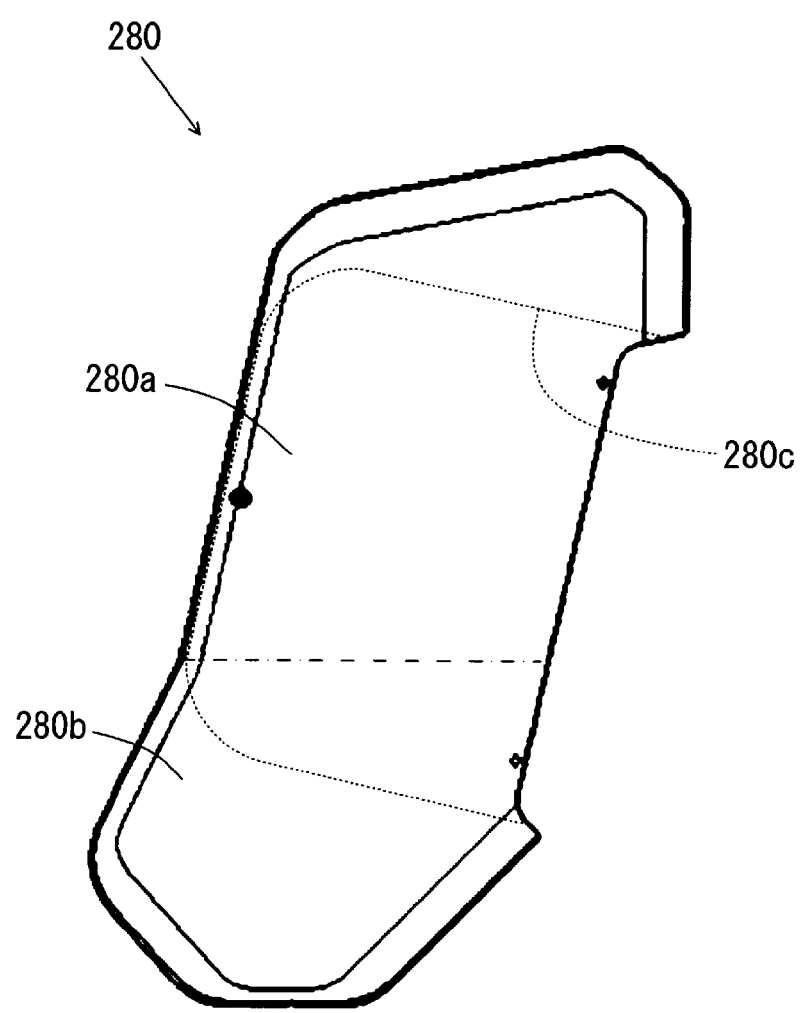
FIG. 23 is a side view of a first shoulder bolster member.

Referring to FIG. 22 and FIG. 23, the first shoulder bolster member 280 includes a main portion 280a and a sub-portion 280b which is at a lower position than the main portion 280a. FIG. 22 and FIG. 23 show a border between the main portion 280a and the sub-portion 280b in an alternate long and short dash line. Referring to FIG. 22, the main portion 280a has its forward end f1 at a more rearward position than a forward end f2 of the sub-portion 280b.

Referring to FIG. 23, the first shoulder bolster member 280 further has a rearward opening hollow portion 280c. The hollow portion 280c extends across the main portion 280a and the sub-portion 280b.

Referring to FIG. 21 and FIG. 22, the connecting member 282 includes a first portion 282a, a second portion 282b, a third portion 282c (see FIG. 22), a fourth portion 282d, a fifth portion 282e and a sixth portion 282f. The first portion 282a extends from the back frame portion 236 outward (leftward in the present preferred embodiment) in the width direction of the vehicle 10. The second portion 282b extends forwardly upward from an end (left end in the present preferred embodiment) of the first portion 282a. The third portion 282c extends forwardly downward from a forward end of the second portion 282b. The fourth portion 282d extends rearward and downward from a lower end of the third portion 282c. The fifth portion 282e extends from a rear end of the fourth portion 282d inward (rightward in the present preferred embodiment) in the width direction of the vehicle 10, and is connected to the back frame portion 236. The sixth portion 282f extends forwardly downward from a rear region of the second portion 282b, and is connected to a rear region of the fourth portion 282d.

Referring to FIG. 21 and FIG. 22, the connecting member 282 is inserted into the hollow portion 280c (see FIG. 21) of the first shoulder bolster member 280. In the present preferred embodiment, the second portion 282b, the third portion 282c (see FIG. 22), the fourth portion 282d and the sixth portion 282f are inserted into the hollow portion 280c. Thus, the first shoulder bolster member 280 is attached to the connecting member 282. In the present preferred embodiment, the hollow portion 280c defines a mounting portion of the first shoulder bolster member 280.

The first portion 282a and the fifth portion 282e are fixed to the back frame portion 236 preferably by welding, for example. Thus, the first shoulder bolster member 280 is supported by the seat frame 228 (more specifically, the back frame portion 236) at two positions which are spaced from each other in an up-down direction.

The second portion 23b is left-right symmetrical with the first portion 23a. Therefore, the second portion 23b will be described only briefly.

Figure 24:
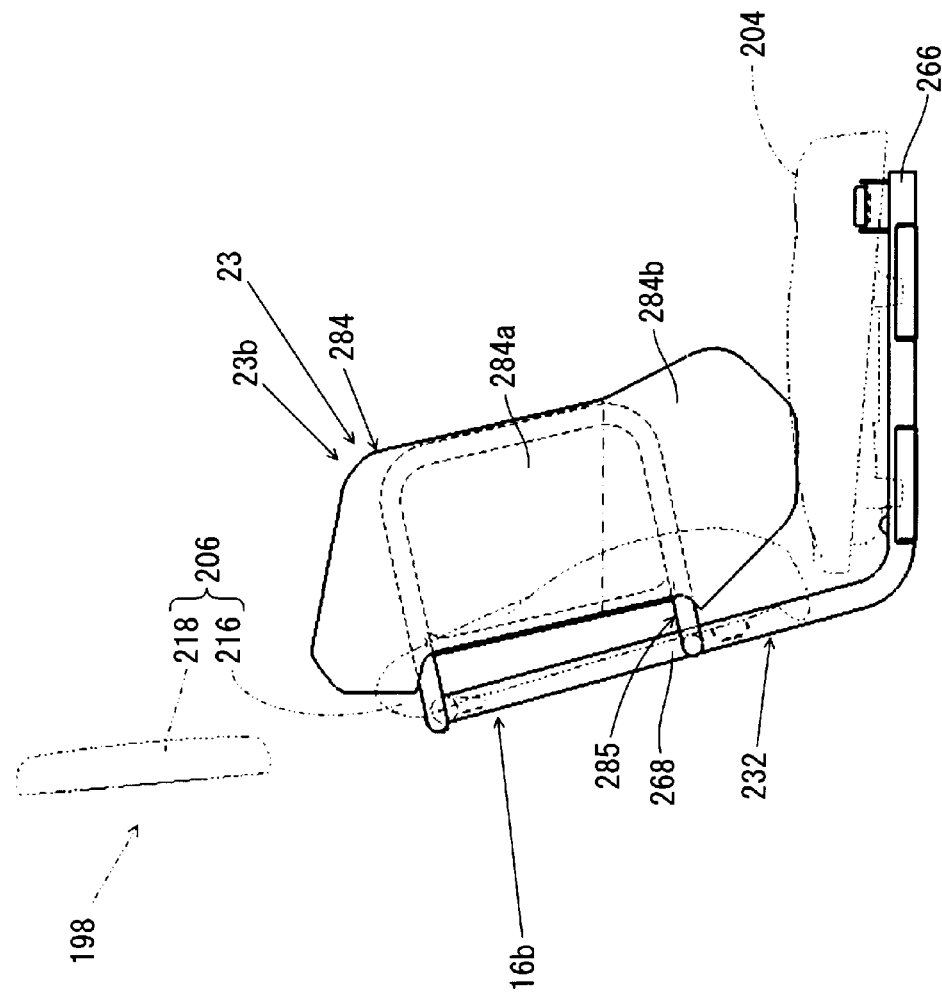
FIG. 24 is a side view (from a right side) showing the seat frame portion and the shoulder bolster portion.

Referring to FIG. 24, the second shoulder bolster member 284 includes a main portion 284a and a sub-portion 284b. The main portion 284a and the sub-portion 284b are in the same relationship as in the main portion 280a and the sub-portion 280b. Referring to FIG. 21, the second shoulder bolster member 284 further includes a hollow portion 284c which is like the hollow portion 280c.

The connecting member 285 is inserted into the hollow portion 284c. Thus, the second shoulder bolster member 284 is attached to the connecting member 282. In the present preferred embodiment, the hollow portion 284c serves as a mounting portion of the second shoulder bolster member 284. The connecting member 285 is fixed to the back frame portion 268 preferably by welding, for example. In the present preferred embodiment, the connecting member 285 is fixed to the back frame portion 268 at two positions which are spaced from each other in an up-down direction. Thus, the second shoulder bolster member 284 is supported by the seat frame 232 (more specifically, the back frame portion 268) at two positions which are spaced from each other in an up-down direction.

In the arrangement described above, the shoulder bolster portion 23 is fixed to the seat frame portion 16b.

Figure 25:
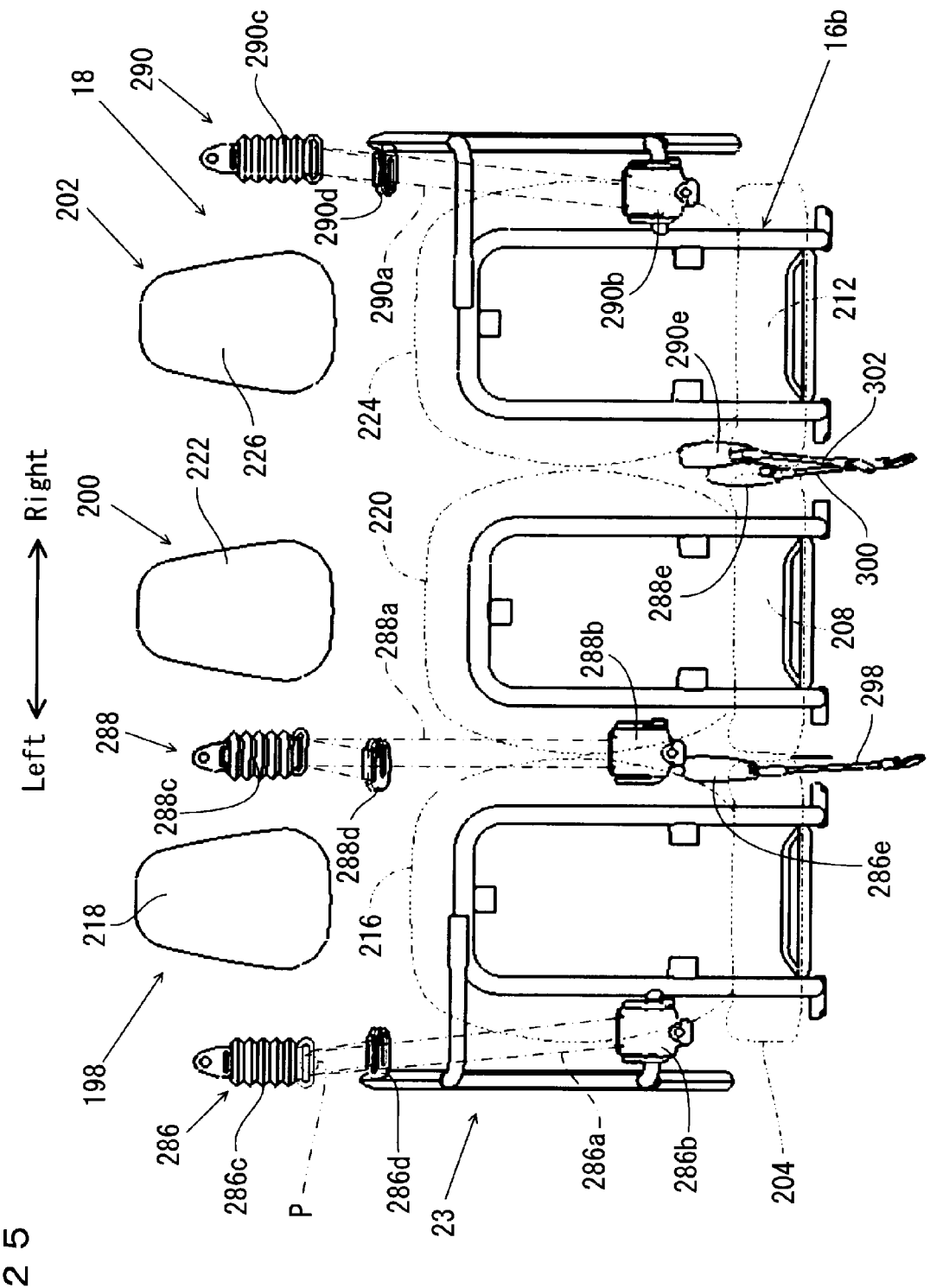
FIG. 25 is a rear view showing the seat frame portion, the seat unit, the shoulder bolster portion, and a plurality of seat belt units.

Referring to FIG. 18 and FIG. 25, the vehicle 10 further includes a plurality (for example, three in the present preferred embodiment) of three-point type seat belt units 286, 288, 290. The seat belt unit 286 is for the seat portion 198, the seat belt unit 288 is for the seat portion 200 and the seat belt unit 290 is for the seat portion 202.

Referring to FIG. 25, the seat belt unit 286 includes a belt member 286a; a winding device 286b that winds the belt member 286a; a shoulder anchor 286c which slidably supports the belt member 286a pulled out of the winding device 286b; a tongue member 286d which is attached to the belt member 286a; and a buckle portion 286e which engages with the tongue member 286d and fixes the belt member 286a. The shoulder anchor 286c slidably supports the belt member 286a at a support position P which is higher than the seat back portion 216.

The seat belt units 288, 290 preferably have the same configuration with the seat belt unit 286. The seat belt unit 288 includes a belt member 288a, a winding device 288b, a shoulder anchor 288c, a tongue member 288d and a buckle portion 288e. The seat belt unit 290 includes a belt member 290a, a winding device 290b, a shoulder anchor 290c, a tongue member 290d and a buckle portion 290e.

Referring to FIG. 8 and FIG. 25, the winding device 286b is supported by the cross member 52 via a bracket 292, the winding device 288b is supported by the cross member 52 via a bracket 294, and the winding device 290b is supported by the cross member 52 via a bracket 296. At least a portion of the winding device 288b is disposed at a more forward position than a forward end of the cargo bed 24. In the present preferred embodiment, the entire winding device 288b is disposed at a more forward position than the forward end of the cargo bed 24.

The shoulder anchor 286c is supported by the connecting portion 82b via unillustrated fasteners (such as bolts and nuts), for example, the shoulder anchor 288c is supported by the mounting portion 90c via unillustrated fasteners, and the shoulder anchor 290c is supported by the connecting portion 83b via unillustrated fasteners. The buckle portion 286e is supported by the support frame portion 48a via a connecting member 298, the buckle portion 288e is supported by the support frame portion 48b via a connecting member 300, and the buckle portion 290e is supported by the support frame portion 48b via a connecting member 302.

In the present preferred embodiment, the shoulder anchor 288c of the seat belt unit 288 for the seat portion 200 is supported by the cross member portion 86 (more specifically, the mounting portion 90c of the support member 90) at a higher position than the upper end of the steering wheel 20. Referring to FIG. 25, the shoulder anchor 288c is on the side of the seat portion 198 when viewed from the seat portion 200. When viewed from the shoulder anchor 288c, the buckle portion 288e is at a lower position on the side of the seat portion 202. In other words, in a front view, the buckle portion 288e is at a position obliquely downward position from the shoulder anchor 288c.

Figure 26:
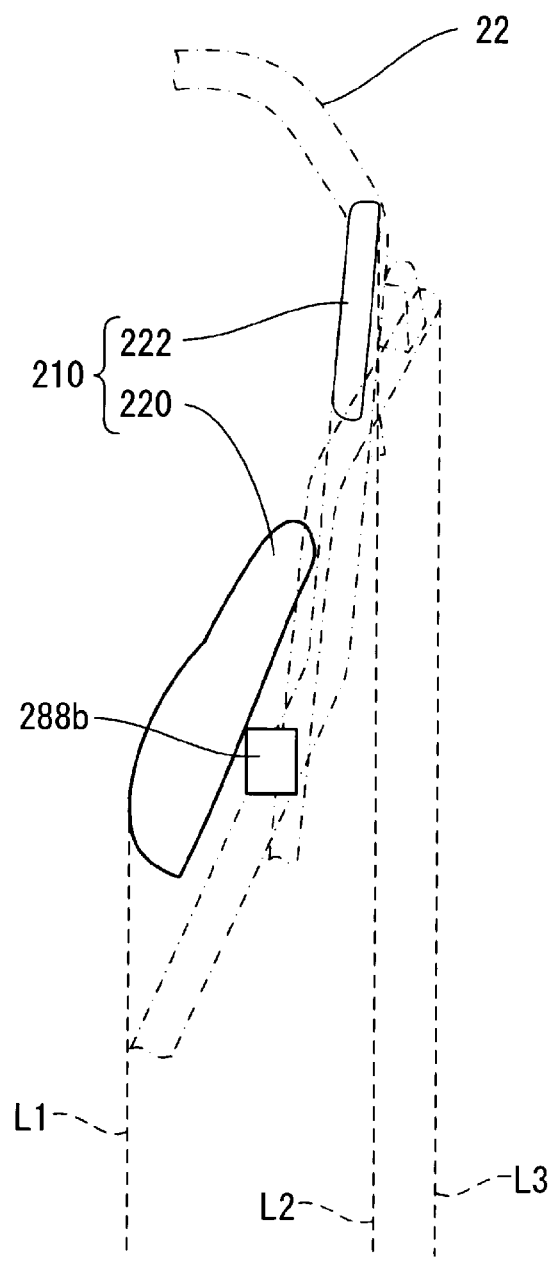
FIG. 26 is a side view showing a rearward end portion of the roll-over protection cage, a back support portions and a winder.

Referring to FIG. 26, in a side view, at least a portion of the winding device 288b is at a more rearward position than a forward end (see broken line L1) of the back support portion 210. Also, at least a portion of the winding device 288b is at a more forward position than a rearward end (see broken line L2) of the back support portion 210. Also, in the present preferred embodiment, at least a portion of the winding device 288b is at a more forward position than a rearward end (see broken line L3) of the roll-over protection cage 22.

In the present preferred embodiment, the entire winding device 288b is at a more rearward position than the forward end of the back support portion 210; at a more forward position than the rearward end of the back support portion 210; and at a more forward position than the rearward end of the roll-over protection cage 22.

Hereinafter, functions and advantages of the vehicle 10 will be described.

The vehicle 10 includes the seat belt unit 288 for the seat portion 200 in the middle of the seat unit 18. In this case, it is possible to secure the person sitting in the seat portion 200, with the seat belt unit 288. Therefore, even when the vehicle 10 makes rolling motion in left and right, it is possible to reduce or prevent left and right sways of the person sitting in the seat portion 200. This prevents contact between the person sitting in the seat portion 200 with the persons sitting in the seat portion 198 and in the seat portion 202. As a result, it is possible to reduce or prevent disturbance of the person sitting in the seat portion 200.

According to the vehicle 10, it is possible to support the shoulder anchor 288c with the cross member portion 86 which is a constituent portion of the roll-over protection cage 22. In other words, the roll-over protection cage 22 can be used for an additional purpose to support the shoulder anchor 288c. This simplifies configuration of the vehicle 10.

The cross member portion 86 is connected to the first connecting portion 22a and the second connecting portion 22b detachably therefrom/attachably thereto. This provides an advantage that the cross member portion 86 can be detached when attaching accessories around the cabin (riding space), for example. This makes it easy to attach accessories to the vehicle 10.

At least a portion of the third connecting portion 22c is at a higher position than the upper end of the back support portion 210. Thus, it is possible to position at least a portion of the third connecting portion 22c at a sufficiently high position. In this case, the third connecting portion 22c can be utilized as a roof member, for example. The shoulder anchor 288c is supported by the cross member portion 86 which is disposed at a lower position than the third connecting portion 22c. Further, the shoulder anchor 288c is supported by the cross member portion 86 at a higher position than the upper end of the steering wheel 20. The arrangement described makes it possible to dispose the shoulder anchor 288c at an appropriate position.

According to the vehicle 10, at least a portion of the winding device 288b is at a more rearward position than the forward end of the back support portion 210 in a side view. In this case, it is possible to prevent cases there the winding device 288b is disposed at an unduly forward position. Therefore, the belt member 288a is smoothly pulled out of the winding device 288b. Also, according to the vehicle 10, at least a portion of the winding device 288b is at a more forward position than the rearward end of the back support portion 210 in a side view. In this case, it is possible to dispose the winding device 288b without a large rearward distance from the back support portion 210 in a fore-aft direction. Thus, it is possible to effectively utilize space behind the back support portion 210.

The shoulder anchor 288c is on the side of the seat portion 198 when viewed from the seat portion 200. In this case, it is possible to sufficiently reduce or prevent swaying of the passenger sitting in the seat portion 200 toward the seat portion 198. Thus, the driver can drive the vehicle 10 more comfortably.

The roll-over protection cage 22 includes the support member 88 which supports the headrest portion 218; the support member 90 which supports the headrest portion 222; and the support member 92 which supports the headrest portion 226. With this structure, the shoulder anchor 286c is supported by the support member 88; the shoulder anchor 288c is supported by the support member 90; and the shoulder anchor 290c is supported by the support member 92. In this case, the support members 88, 90, 92 serves two purposes, i.e., supporting the respective headrest portions 218, 222, 226, and supporting the respective shoulder anchors 286c, 288c, 290c as well. This simplifies the configuration of the vehicle 10.

According to the vehicle 10, it is possible to support the shoulder anchor 288c, with the support member 90 which supports the headrest portion 222. In this case, it is possible to dispose the shoulder anchor 288c near the seat portion 200. Thus, it is possible to support the belt member 288a at a more appropriate position by using the shoulder anchor 288c.

According to the vehicle 10, at least a portion of the winding device 288b is at a more forward position than the rearward end of the roll-over protection cage 22 in a side view. In this case, it is possible to dispose the winding device 288b ahead of the cargo bed 24 without a large distance between the roll-over protection cage 22 and the cargo bed 24 in a fore-aft direction. Thus, the vehicle 10 is made compactly.

In the preferred embodiment described above, description was made for a case where the seat portions 198, 200, 202 preferably include headrest portions 218, 222, 226, respectively. However, there may be cases where any of the plurality of seat portions does not include a headrest portion.

In the preferred embodiment described above, description was made for a case where the seat unit 18 preferably includes a plurality of seat portions 198, 200, 202 which are made independently from each other. However, the seat unit may include a plurality of seat portions which preferably are made integrally with each other. Therefore, preferred embodiments of the present invention are also applicable to vehicles which include a bench seat.

In the preferred embodiment described above, description was made for a case where the seat back portion and the headrest portion preferably are made independently from each other. However, the seat back portion and the headrest portion may be made integral with each other.

In the preferred embodiment described above, description was made for a case where the seat unit 18 preferably includes three seat portions 198, 200, 202. However, the number of the seat portions in the seat unit is not limited to the preferred embodiment described above. For example, the seat unit may include four or more seat portions.

In the preferred embodiment described above, description was made for a case where the vehicle 10 preferably includes one seat unit 18. However, the vehicle may include a plurality (two, for example) of seat units arranged in a fore-aft direction.

In the preferred embodiment described above, description was made for a case where the vehicle 10 preferably includes a pair of rear wheels 14. However, the vehicle may include two or more pairs of rear wheels, for example.

In the preferred embodiment described above, description was made for a case where the cross member portion 86 is constituted by an assembly of a plurality of members (the support member 88, the support member 90 and the support member 92 in the preferred embodiment described above). However, there may be cases where the cross member portion is provided by a single member (a pipe-like member, for example). In this case, the single member may have its one end region connected to the side cage member 82 and another end region connected to the side cage member 83.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
a pair of front wheels;
at least a pair of rear wheels;
a frame portion supported by the pair of front wheels and the pair of rear wheels;

a first seat portion, a second seat portion and a third seat portion supported by the frame portion and disposed side by side in this order in a width direction of the vehicle;
a roll-over protection cage supported by the frame portion to provide covering above the first seat portion, the second seat portion and the third seat portion; and
a three-point seat belt unit provided to the second seat portion; wherein
the three-point seat belt unit includes a belt member, a winding device that winds the belt member, a shoulder anchor that slidably supports the belt member that is pulled out of the winding device, and a buckle portion disposed obliquely below the shoulder anchor in a front view to fix the belt member;
the roll-over protection cage includes a cross member portion extending in the width direction of the vehicle; and
the shoulder anchor is supported by the cross member portion.

2. The vehicle according to claim 1, wherein
the cross member portion includes a first end portion and a second end portion, a first connecting portion connected to the frame portion at a lower position than the first end portion and connecting the first end portion and the frame portion to each other, and a second connecting portion connected to the frame portion at a lower position than the second end portion and connecting the second end portion and the frame portion to each other;
at least a portion of the first connecting portion is located farther outward than the first seat portion in the width direction of the vehicle; and
at least a portion of the second connecting portion is located farther outward than the third seat portion in the width direction of the vehicle.

3. The vehicle according to claim 2, wherein the cross member portion is attachable to/detachable from the first connecting portion and the second connecting portion.

4. The vehicle according to claim 2, further comprising a steering wheel in front of the first seat portion; wherein
the second seat portion includes a seat bottom portion that supports a human body from below, and a back support portion that supports the human body from behind;
the roll-over protection cage further includes a third connecting portion extending at a higher position than the cross member portion in the width direction of the vehicle to connect an upper end of the first connecting portion and an upper end of the second connecting portion to each other;
at least a portion of the third connecting portion is at a higher position than an upper end of the back support portion;
at least a portion of the cross member portion is at a higher position than an upper end of the steering wheel; and
the shoulder anchor is supported by the cross member portion at a higher position than an upper end of the steering wheel.

5. The vehicle according to claim 1, wherein
the second seat portion includes a seat bottom portion that supports a human body from below, and a back support portion that supports the human body from behind; and
at least a portion of the winding device is at a more rearward position than a forward end and at a more forward position than a rearward end of the back support portion in a side view.

6. The vehicle according to claim 2, further comprising a steering wheel in front of the first seat portion; wherein
the shoulder anchor is on the first seat portion side in a width direction of the vehicle when viewed from the second seat portion.

7. The vehicle according to claim 2, wherein
at least one of the first seat portion, the second seat portion and the third seat portion includes a headrest portion;
the roll-over protection cage includes a support portion supporting the headrest portion; and
the shoulder anchor is supported by the support portion.

8. The vehicle according to claim 2, wherein
the first seat portion includes a first headrest portion;
the second seat portion further includes a second headrest portion;
the third seat portion includes a third headrest portion;
the roll-over protection cage includes a first support portion supporting the first headrest portion, a second support portion supporting the second headrest portion, and a third support portion supporting the third headrest portion; and
the shoulder anchor is supported by the second support portion.

9. The vehicle according to claim 1, further comprising a cargo bed provided behind the roll-over protection cage and supported by the frame portion; wherein
the second seat portion includes a seat bottom portion and a seat back portion; and
at least a portion of the winding device is at a more rearward position than a forward end of the seat back portion, and at a more forward position than a rearward end of the roll-over protection cage in a side view.

10. The vehicle according to claim 9, further comprising a steering wheel in front of the first seat portion; wherein
the shoulder anchor is on the first seat portion side in the width direction of the vehicle when viewed from the second seat portion.

11. The vehicle according to claim 9, wherein at least one of the first seat portion, the second seat portion and the third seat portion includes a headrest portion;
the roll-over protection cage includes a support portion supporting the headrest portion; and
the shoulder anchor is supported by the support portion.

12. The vehicle according to claim 9, wherein
the first seat portion includes a first headrest portion;
the second seat portion includes a second headrest portion;
the third seat portion includes a third headrest portion;
the roll-over protection cage includes a first support portion supporting the first headrest portion, a second support portion supporting the second headrest portion, and a third support portion supporting the third headrest portion; and
the shoulder anchor is supported by the second support portion.

* * * * *